United States Patent
Martin et al.

(10) Patent No.: US 10,484,762 B2
(45) Date of Patent: *Nov. 19, 2019

(54) CONTROLLED SIGNALS USING SIGNAL GUIDES FOR SENSOR DEVICES

(71) Applicant: Eaton Intelligent Power Limited, Dublin (IE)

(72) Inventors: Russell Tyler Martin, Peachtree City, GA (US); Kyle Proctor, Decatur, GA (US); Scott David Wegner, Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/150,588

(22) Filed: Oct. 3, 2018

(65) Prior Publication Data

US 2019/0037285 A1 Jan. 31, 2019

Related U.S. Application Data

(63) Continuation of application No. 15/261,053, filed on Sep. 9, 2016, now Pat. No. 10,117,002, which is a
(Continued)

(51) Int. Cl.
*H04Q 9/00* (2006.01)
*G08B 21/18* (2006.01)
(Continued)

(52) U.S. Cl.
CPC .............. *H04Q 9/00* (2013.01); *G01J 1/0266* (2013.01); *G01J 1/0271* (2013.01); *G01J 1/04* (2013.01);
(Continued)

(58) Field of Classification Search
CPC .............. F21V 23/0442; F21V 23/0464; G01J 1/0266; G01J 1/0271; G01J 1/04;
(Continued)

(56) References Cited

U.S. PATENT DOCUMENTS 4,807,954 A * 2/1989 Oyamada ................ G02B 6/262
385/33
5,696,865 A * 12/1997 Beeson ................ G02B 6/0281
385/124
(Continued)

FOREIGN PATENT DOCUMENTS

DE 202015104310 10/2015
FR 2971052 8/2012
WO WO 2014078426 5/2014

OTHER PUBLICATIONS

European Search Report for EP 17190153 dated Feb. 5, 2018.

*Primary Examiner* — Quan-Zhen Wang
*Assistant Examiner* — Rajsheed O Black-Childress
(74) *Attorney, Agent, or Firm* — King & Spalding LLP

(57) ABSTRACT

A signal guide for a sensor device is disclosed herein. The signal guide can include a base having a first proximal aperture, where the first proximal aperture has a first cross-sectional profile, where the first proximal aperture is configured to be disposed proximate to a first transceiver element of the sensor device. The signal guide can also include a body disposed adjacent to the base, wherein the body comprises a first main channel that adjoins the first proximal aperture. The signal guide can further include a distal end disposed adjacent to the body opposite the base, where the distal end includes a first distal aperture that adjoins the first main channel, where the first distal aperture has a second cross-sectional profile, where the first distal aperture is configured to be disposed proximate to an ambient environment.

20 Claims, 14 Drawing Sheets

Related U.S. Application Data continuation-in-part of application No. 15/235,939, filed on Aug. 12, 2016.

(60) Provisional application No. 62/218,340, filed on Sep. 14, 2015.

(51) Int. Cl.
| | | |
|---|---|---|
| *G01J 1/04* | (2006.01) | |
| *G02B 6/00* | (2006.01) | |
| *F21V 23/04* | (2006.01) | |
| *H05B 37/02* | (2006.01) | |
| *G01J 1/02* | (2006.01) | |
| *G01J 1/06* | (2006.01) | |

(52) U.S. Cl.
CPC ............... *G01J 1/0407* (2013.01); *G01J 1/06* (2013.01); *G02B 6/00* (2013.01); *G08B 21/185* (2013.01); *F21V 23/0442* (2013.01); *F21V 23/0464* (2013.01); *H04Q 2209/80* (2013.01); *H04Q 2209/86* (2013.01); *H05B 37/0218* (2013.01); *H05B 37/0227* (2013.01)

(58) Field of Classification Search
CPC .. G01J 1/0407; G01J 1/06; G02B 6/00; G08B 21/185; H04Q 2209/80; H04Q 2209/86; H04Q 9/00; H05B 37/0218; H05B 37/0227

See application file for complete search history.

(56) References Cited

U.S. PATENT DOCUMENTS

| | | |
|---|---|---|
| 7,286,296 B2 | 10/2007 | Chaves et al. |
| 9,681,520 B1 | 6/2017 | Berry |
| 2010/0179417 A1* | 7/2010 | Russo ............... A61M 39/08 600/424 |
| 2011/0211833 A1 | 9/2011 | Chen |
| 2015/0099983 A1 | 4/2015 | Hatzilias |
| 2016/0126950 A1* | 5/2016 | Lucantonio ........ H01R 13/6683 307/113 |
| 2016/0381757 A1* | 12/2016 | Chang ..................... F21S 8/02 315/152 |

* cited by examiner

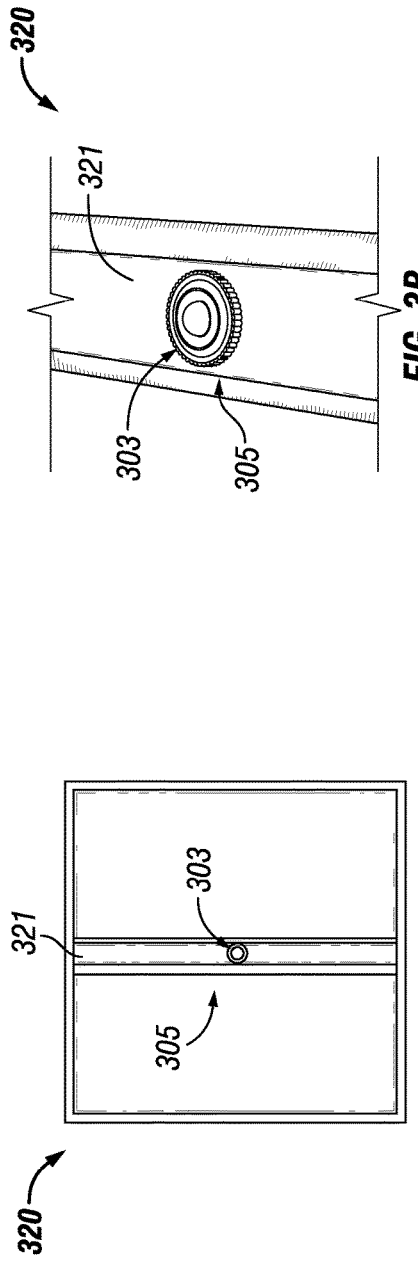
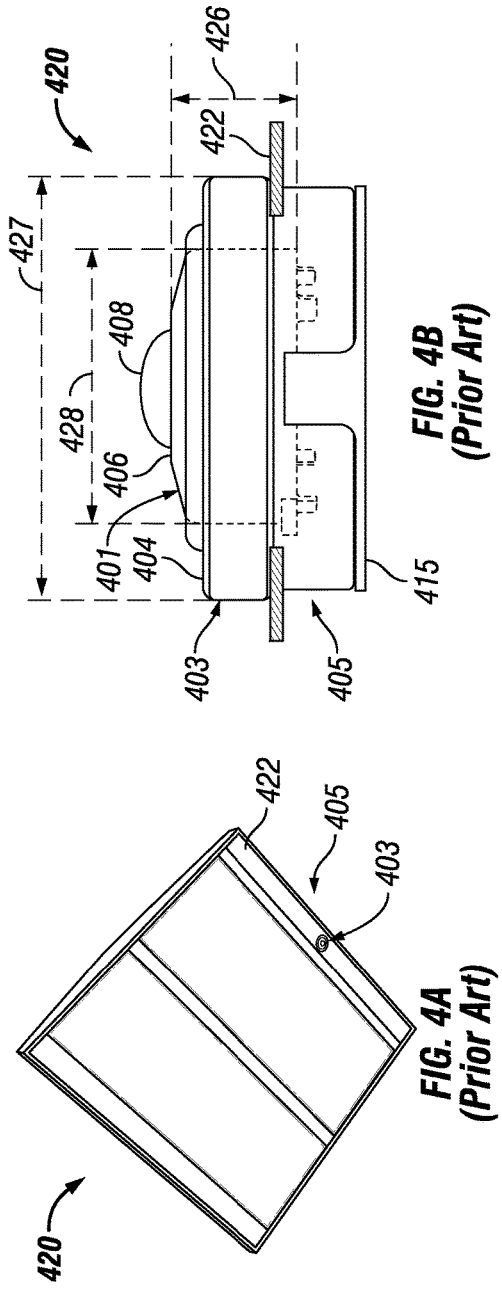

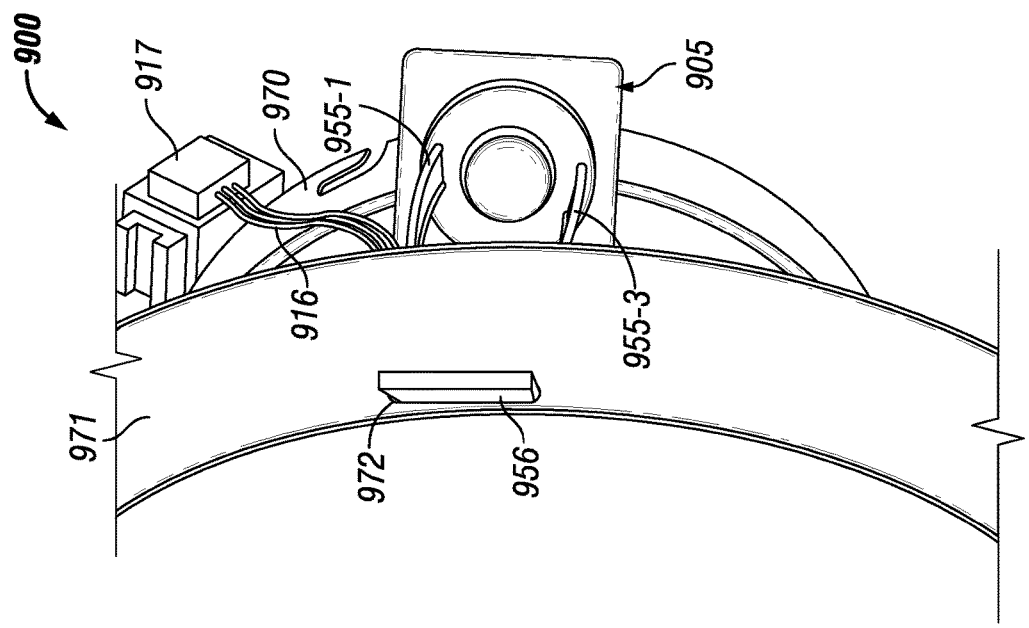
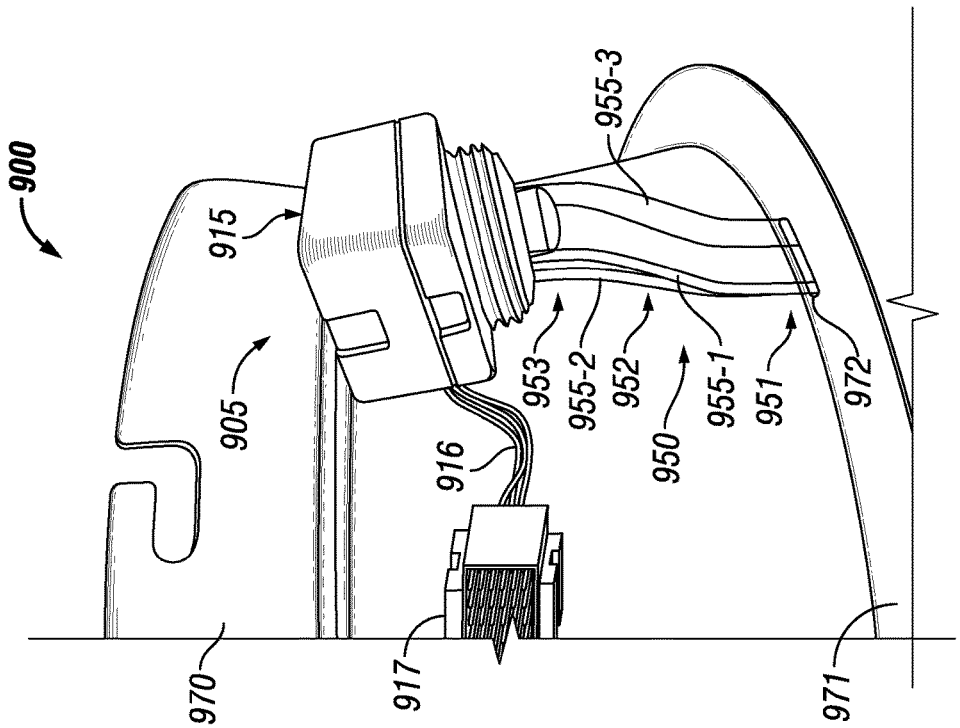
FIG. 9B
FIG. 9A

CONTROLLED SIGNALS USING SIGNAL GUIDES FOR SENSOR DEVICES

CROSS-REFERENCE TO RELATED APPLICATIONS

This application is a continuation application of and claims priority under 35 U.S.C. § 120 to U.S. patent application Ser. No. 15/261,053, titled "Controlled Signals Using Signal Guides For Sensor Devices" and filed on Sep. 9, 2016, which is a continuation-in-part application of and claims priority to U.S. patent application Ser. No. 15/235,939, entitled "Signal Guides For Sensor Devices" and filed on Aug. 12, 2016, which itself claims priority under 35 U.S.C. § 119 to U.S. Provisional Patent Application Ser. No. 62/218,340, titled "Light Guides For Sensor Devices" and filed on Sep. 14, 2015. The entire contents of these aforementioned applications are hereby incorporated herein by reference.

TECHNICAL FIELD

Embodiments described herein relate generally to sensor devices used in spaces, and more particularly to systems, methods, and devices for signal guides for sensor devices.

SUMMARY

In general, in one aspect, the disclosure relates to a signal guide for a sensor device. The signal guide can include a base having a first proximal aperture, where the first proximal aperture has a first cross-sectional profile, where the first proximal aperture is configured to be disposed proximate to a first transceiver element of the sensor device. The signal guide can also include a body disposed adjacent to the base, where the body comprises a first main channel that adjoins the first proximal aperture. The signal guide can further include a distal end disposed adjacent to the body opposite the base, where the distal end includes a first distal aperture that adjoins the first main channel, where the first distal aperture has a second cross-sectional profile, where the first distal aperture is configured to be disposed proximate to an ambient environment. The first proximal aperture, the first main channel, and the first distal aperture can form a first continuous channel. The first cross-sectional profile can be different than the second cross-sectional profile. The first continuous channel can be configured to transfer signals between the first transceiver element of the sensor device and the ambient environment.

In another aspect, the disclosure can generally relate to a sensor device subassembly. The subassembly can include a first sensor device having a first transceiver element, and a signal guide disposed adjacent to the first transceiver element. The signal guide can include a base having a first proximal aperture, where the first proximal aperture has a first cross-sectional profile, where the first proximal aperture is disposed proximate to the first transceiver element of the first sensor device. The signal guide can also include a body disposed adjacent to the base, where the body includes a first main channel that adjoins the first proximal aperture. The signal guide can further include a distal end disposed adjacent to the body opposite the base of the signal guide, where the distal end includes a first distal aperture that adjoins the first main channel, where the first distal aperture has a second cross-sectional profile, where the first distal aperture is configured to be disposed proximate to an ambient environment. The first proximal aperture, the first main channel, and the first distal aperture can form a first continuous channel. The first cross-sectional profile can be different than the second cross-sectional profile. The first continuous channel can transfer a first plurality of signals between the first transceiver element of the first sensor device and the ambient environment.

In yet another aspect, the disclosure can generally relate to a system that includes a sensor device comprising at least one transceiver element, and a signal guide disposed adjacent to the at least one transceiver element. The signal guide of the system can include a base having a proximal aperture, where the proximal aperture has a first cross-sectional profile, where the proximal aperture is disposed proximate to the at least one transceiver element of the sensor device. The signal guide of the system can also include a body disposed adjacent to the base, where the body comprises a main channel that adjoins the proximal aperture. The signal guide of the system can further include a distal end disposed adjacent to the body opposite the base of the signal guide, where the distal end includes a distal aperture that adjoins the main channel, where the distal aperture has a second cross-sectional profile. The system can also include an operational device that includes an aperture, where the distal end of the signal guide is disposed adjacent to the aperture and is exposed to an ambient environment. The proximal aperture, the main channel, and the distal aperture can form a continuous channel between the ambient environment and the at least one transceiver element of the sensor device.

These and other aspects, objects, features, and embodiments will be apparent from the following description and the appended claims.

BACKGROUND

Sensor devices are used in a variety of applications. For example, sensor devices are used for energy management. In such a case, the sensor device can be placed in a space (e.g., a room) and can measure one or more of a number of parameters within the space. Such parameters can include, but are not limited to, an amount of ambient light and movement. Thus, a sensor device can include one or more of a number of sensors. Examples of sensors that are included in a sensor device can include, but are not limited to, a photo sensor and an infrared detector.

In addition, or in the alternative, a sensor device can include one or more of a number of other components. For example, a sensor device can include an indicating light to let a user know whether the sensor device is operating properly. As a result, a sensor device can have a significant footprint when mounted on a surface (e.g., a ceiling of a room, a wall of a room) or on an electrical device (e.g., a light fixture).

BRIEF DESCRIPTION OF THE DRAWINGS

The drawings illustrate only example embodiments of signal guides for sensor devices and are therefore not to be considered limiting of its scope, as signal guides for sensor devices may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 3A and 3B show a light fixture with a sensor device currently known in the art.

FIGS. 4A and 4B show another light fixture with a sensor device currently known in the art.

FIGS. 9A-9C show a light fixture with a sensor device having a signal guide.

DETAILED DESCRIPTION OF EXAMPLE EMBODIMENTS

Figure 1A:
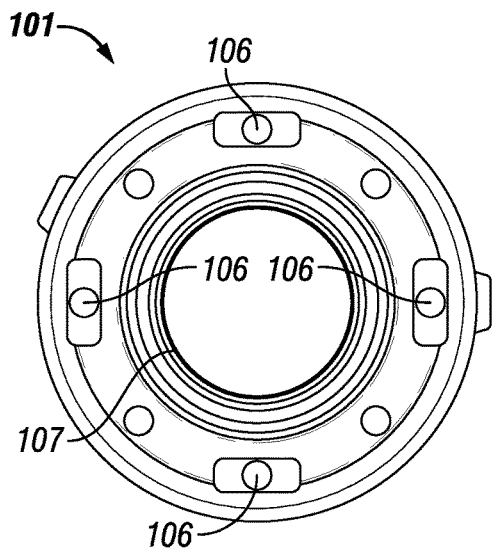
FIGS. 1A-1C show various portions of a sensor device currently known in the art.
Figure 1C:
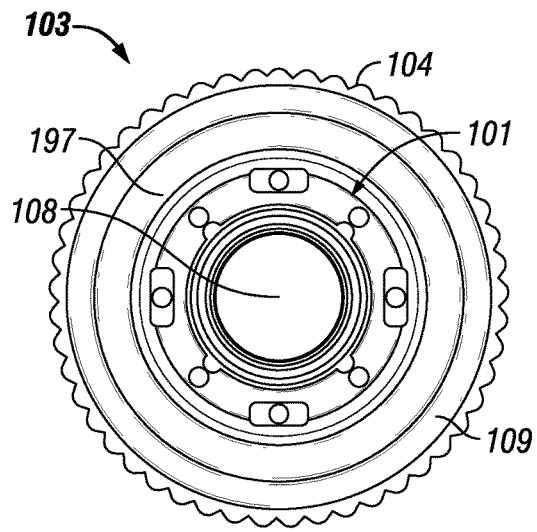
Figure 1B:
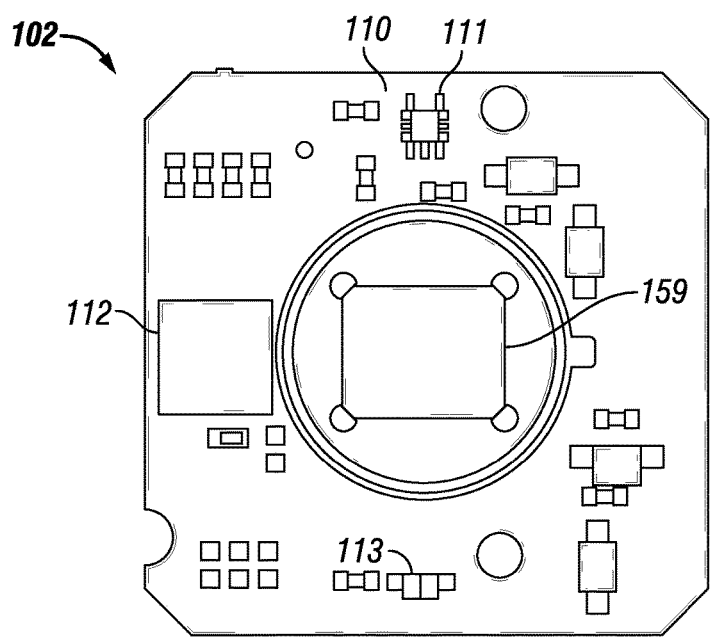

The example embodiments discussed herein are directed to systems, apparatuses, and methods of signal guides for sensor devices. While example embodiments described herein are directed to use with lighting systems, example embodiments can also be used in systems having other types of devices. Examples of such other systems can include, but are not limited to, security systems, fire protection systems, and emergency management systems. Thus, example embodiments are not limited to use with lighting systems.

Example signal guides are designed to transmit any of a number of signal types. Examples of types of signals that can be transmitted through example signal guides described herein can include, but are not limited to, visible light waves, microwaves, radio frequency waves, infrared waves, ultraviolet waves, electromagnetic waves, energy waves, sound waves, control signals, light waves, data signals, and images. Example signal guides (or portions thereof) can be made of one or more of a number of materials (e.g., metal, plastic, rubber, ceramic) to allow the signal guides to perform the functions described herein.

As described herein, a user can be any person that interacts with sensor devices that include example signal guides. Examples of a user may include, but are not limited to, a consumer, an electrician, an engineer, a mechanic, an instrumentation and control technician, a consultant, a contractor, an operator, and a manufacturer's representative. For any figure shown and described herein, one or more of the components may be omitted, added, repeated, and/or substituted. Accordingly, embodiments shown in a particular figure should not be considered limited to the specific arrangements of components shown in such figure. For example, features shown in one or more figures or described with respect to one embodiment can be applied to another embodiment associated with a different figure or description.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

In certain example embodiments, a light fixture or other device that includes one or more sensor devices that use example signal guides (or portions thereof) described herein can meet one or more of a number of standards, codes, regulations, and/or other requirements established and maintained by one or more entities. Examples of such entities include, but are not limited to, Underwriters' Laboratories (UL), the Institute of Electrical and Electronics Engineers (IEEE), International Electrotechnical Commission (IEC) and the National Fire Protection Association (NFPA). For example, wiring (the wire itself and/or the installation of such wire) that electrically couples a sensor device that includes an example signal guide with a light fixture may fall within one or more standards set forth in the National Electric Code (NEC). In such a case, the NEC defines Class 1 circuits and Class 2 circuits under various Articles, depending on the application of use.

Example embodiments of signal guides for sensor devices will be described more fully hereinafter with reference to the accompanying drawings, in which example embodiments of signal guides for sensor devices are shown. Signal guides for sensor devices may, however, be embodied in many different forms and should not be construed as limited to the example embodiments set forth herein. Rather, these example embodiments are provided so that this disclosure will be thorough and complete, and will fully convey the scope of signal guides for sensor devices to those of ordinary skill in the art. Like, but not necessarily the same, elements (also sometimes called components) in the various figures are denoted by like reference numerals for consistency.

Terms such as "first", "second", "top", "bottom", "side", "inner", "outer", "base", "input", "output", "width", "depth", "height", "proximal", and "distal" are used merely to distinguish one component (or part of a component or state of a component) from another. Such terms are not meant to denote a preference or a particular orientation, and are not meant to limit embodiments of signal guides for sensor devices. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 2A:
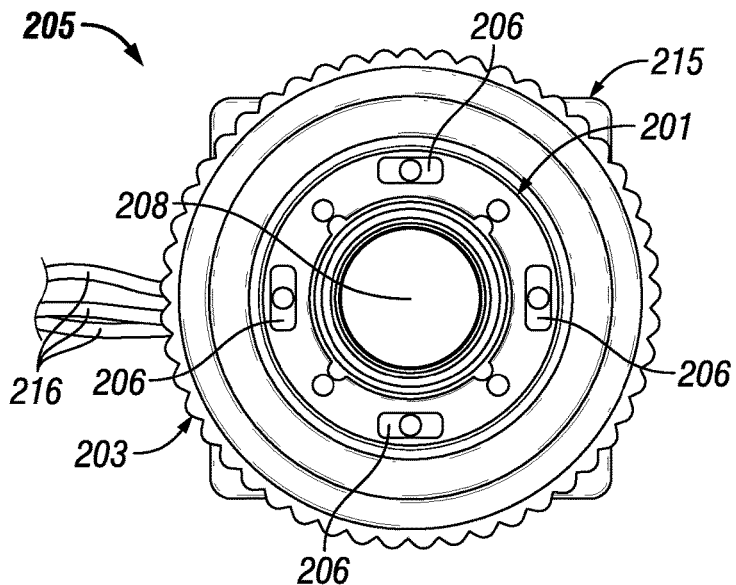
FIGS. 2A and 2B show a sensor device currently known in the art.
Figure 2B:
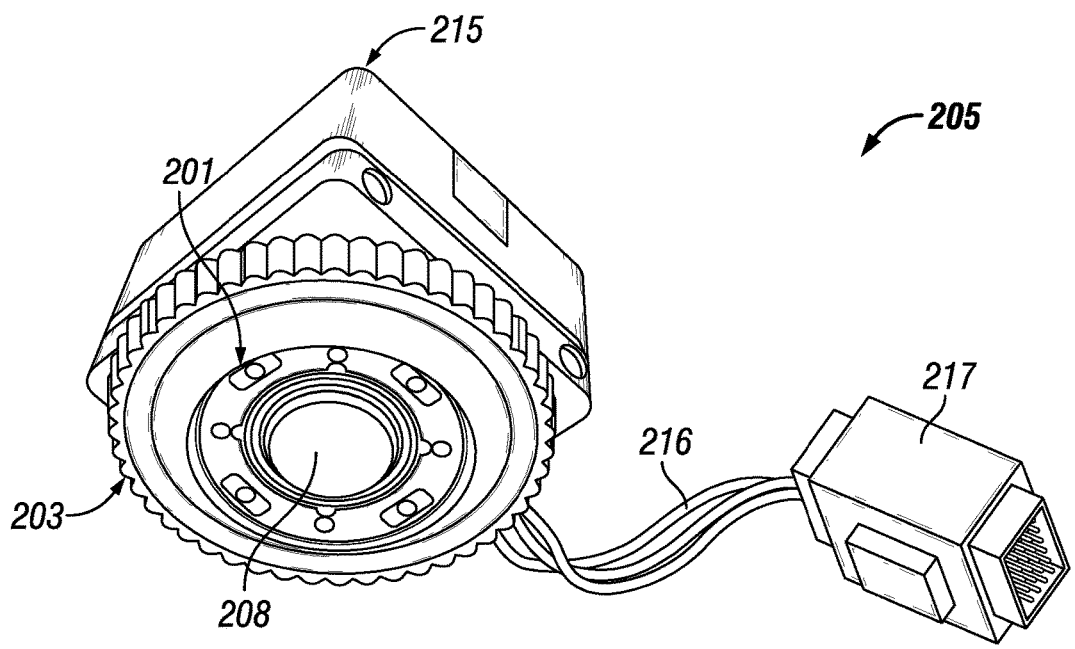

FIGS. 1A-2B show various portions of a sensor device 205 currently known in the art. Specifically, FIG. 1A shows a top view of a cover 101 of the sensor device 205. FIG. 1B shows a top view of a circuit board assembly 102 of the sensor device 205. FIG. 1C shows a top view of a distal assembly 103 of the sensor device 205. FIG. 2A shows a top view of the sensor device 205, and FIG. 2B shows a top-side perspective view of the sensor device 205. The cover 101 is part of the sensor device 205 currently known in the art. A signal guide can be part of, or a separate component from, a sensor device.

Referring to FIGS. 1A-2B, the circuit board assembly 102 is disposed within the housing 215 of the sensor device 205. The circuit board assembly 102 can include a circuit board 110 on which are disposed one or more of a number of components. Examples of such components can include, but are not limited to, a resistor, a capacitor, an integrated circuit, an occupancy sensor 159 (also called, for example, a passive infrared detector 159), a photo sensor 111, an infrared detector 112 (also called, for example, an infrared receiver 112), and a light-emitting diode (LED) assembly 113. For purposes of this application, each of the components that emit an output (e.g., from the photo sensor 111, from the LED assembly 113) can be called, or can include, a transceiver element. As defined herein, the transceiver element of a sensor can send and/or receive signals. A sensor can also include one or more other components, including but not limited to a transducer, which converts one form of energy (e.g., a signal) to another.

The housing 215 of the sensor device 205 is disposed adjacent to the distal assembly 103. The distal assembly 103 includes an inner body 197 and a trim 104 that is movably (e.g., threadably) coupled to the inner body 197. The trim 104 can be used to hold one or more components of the sensor device 205 in place. For example, the trim 104 can be used to retain the cover 101 currently known in the art. The cover 101 includes a number of holes 106 that are each substantially linear and are also linearly aligned with a transceiver element (e.g., photo sensor 111, infrared detector 112, LED assembly 113) disposed on the circuit board 110. In this example, the cover 101 has four holes 106 (three of which are actually used) that are located at different points around the aperture 107 disposed in the middle of the cover 101.

As a result of the configuration of covers known in the art, such as cover 101 of FIGS. 1A-2B, the footprint of the sensor device 205 can be large and protruding. In addition, the number of features of the sensor device 205 that are visible to a user can be high. Consequently, some sensor devices currently used in the art, such as sensor device 205, can lack in aesthetic appeal. The sensor device 205 can include an electrical connector end 217 that is configured to couple to a complementary electrical connector end of an electrical device. One or more electrical conductors 216 can be used to electrically couple the components of the circuit board assembly 102 to the electrical connector end 217. The occupancy sensor housing 108 (e.g., a receiver) of the distal assembly 103 is disposed within the aperture 107 that traverses the center of the cover 101.

A sensor device currently used in the art can be mounted in any of a number of places relative to an electrical device (e.g., a light fixture). For instance, FIGS. 3A-4B show examples of how a sensor device currently used in the art can be integrated with an electrical device. Specifically, FIG. 3A shows a bottom view of an electrical device 320 (in this case, a light fixture) having a sensor device 305 disposed on a center panel 321. FIG. 3B shows a bottom-side perspective view that details the sensor device 305 of FIG. 3A disposed on the center panel 321. FIG. 4A shows a bottom-side perspective view of another electrical device 420 (also a light fixture in this case) having a sensor device 405 disposed on an outer panel 422. FIG. 4B shows a cross-sectional side view that details the sensor device 405 of FIG. 4A disposed on the outer panel 422.

The sensor device 305 of FIGS. 3A and 3B and the sensor device 405 of FIGS. 4A and 4B are substantially the same as the sensor device 205 of FIGS. 1A-2B. Referring to FIGS. 1A-4B, the distal assembly 303 of the sensor device 305 of FIGS. 3A and 3B and the digital assembly 403 of the sensor device 405 of FIGS. 4A and 4B are visible to a user. As FIGS. 3A-4B show, the footprint of the distal assembly 303 and the distal assembly 403 is large relative to the size of the rest of the electrical device 320 and the electrical device 420, respectively.

As shown in FIG. 4B, the trim 404 of the distal assembly 405 is used to secure the rest of the distal assembly 405 to the outer-facing surface of the outer panel 422 and to secure the housing 415 to the inner-facing surface of the outer panel 422. The trim 404 has a width 427 (e.g., 1.3 inches) and a height (which can be substantially similar to the height 426 of the cover 401). The cover 401 also has a width that is less than the width 427 of the trim 404. In some cases, the shape and/or size of portions of a sensor device currently known in the art that would be visible to a user are so large that they cannot be used with certain electrical devices.

When a sensor device 405 is relatively small (e.g., trim 404 with a width 427 of less than 1.5 inches), the sensor device 405 can be called a mini sensor device (or, more simply, a mini sensor). While the examples shown in the figures are directed to mini sensor devices, embodiments can be used with sensor devices of any size, including relatively large sensor devices.

Figures 5A, 5B:
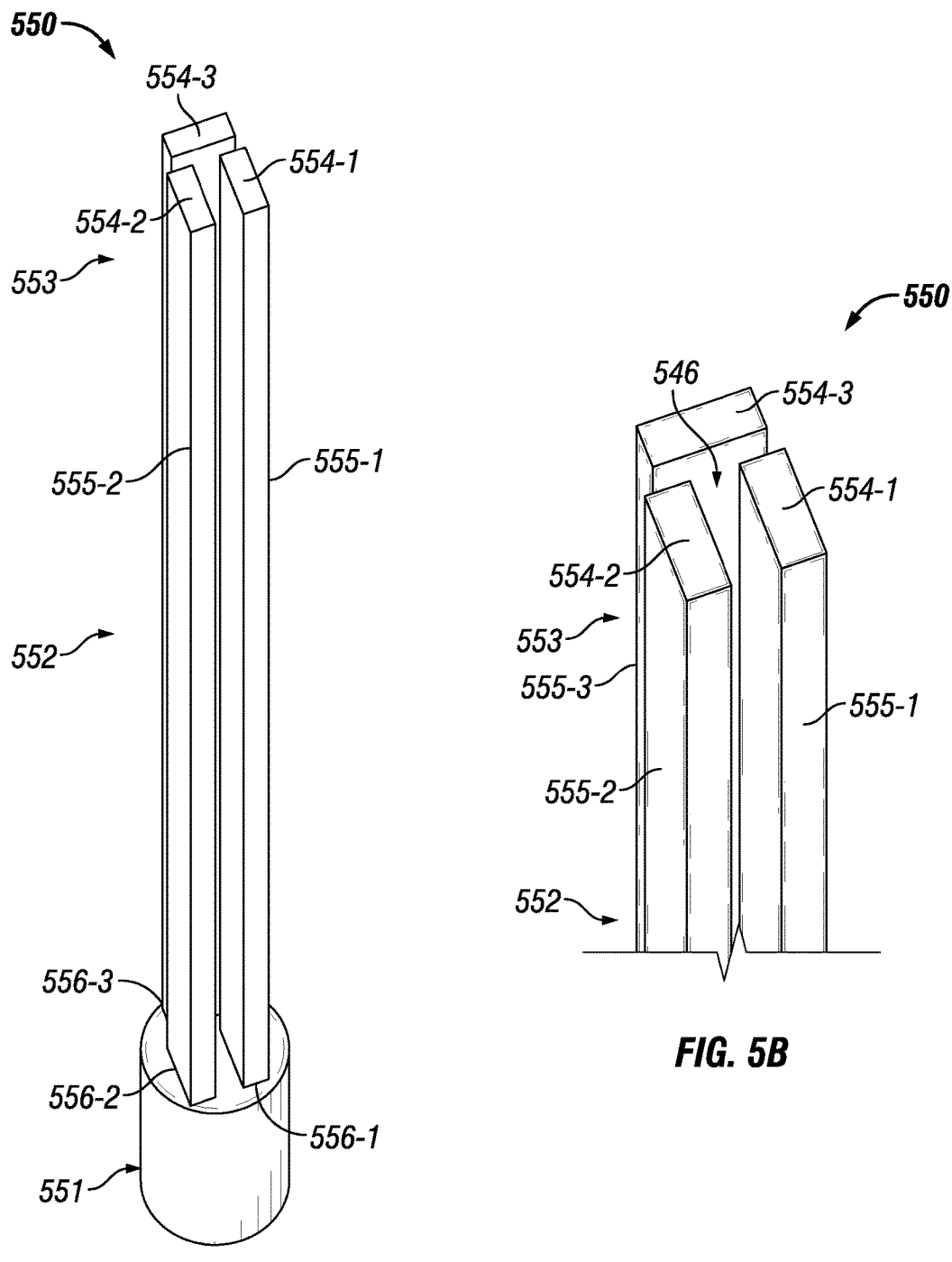
FIGS. 5A and 5B show a signal guide for a sensor device.

A sensor device can be located completely behind (as opposed to only partially behind) a surface (e.g., a trim of a light fixture). In other words, a sensor device can be substantially hidden from view of a user. Such embodiments are shown with respect to FIGS. 5A-9C. Referring to FIGS. 1A-9C, FIGS. 5A and 5B show a first example of a signal guide 550. Specifically, FIG. 5A shows a bottom-side perspective view of the signal guide 550 for a sensor device. FIG. 5B shows a detailed bottom-side perspective view of a distal end of the signal guide 550 of FIG. 5A. As discussed below, by changing the cross-sectional shape of a channel of a sensor guide along the length of the channel, the field of angular distribution to which a signal can be sent and/or from which a signal can be retrieved can be controlled for a particular application.

In this case, the signal guide 550 has a base 553 that is configured to be disposed proximate to a component (e.g., a trim) of an electrical device (e.g., a light fixture) for which the sensor device is used. At the opposite end of the signal guide 550, there are three proximal apertures 554 (proximal aperture 554-1, proximal aperture 554-2, and proximal aperture 554-3) that are configured to be disposed adjacent to one or more of the transceiver elements mounted on the circuit board assembly of the sensor device. The proximal apertures 554 of the signal guide 550 can be part of one or more channels, where each channel is disposed within a body 552 (e.g., body 552-1, body 552-2) that extends from and is coupled to the proximal end of the base 553. Each body 552 can have a distal end coupled to the base 553 and include a distal aperture 556 that receives an energy (e.g., light, sound)

wave or other type of signal from a transceiver element through the proximal aperture 553 and the main channel 555, and send the signal through the base 553. In addition, or in the alternative, the distal aperture 556 can transmit an energy wave (or other type of signal) that is received from the base 553, and transmits the signal through the main channel 555 and the proximal aperture 554 to the transceiver element of a sensor device.

The base 553 can be configured so that energy waves or other types of signals emitted by a transceiver element can be directed in some way to the distal apertures 556 of a channel of the signal guide 550. Alternatively, one or more distal apertures 556 can be incorporated within or at a distal end of the base 553. In such a case, a channel can extend into the base 553 to a point where the associated distal aperture 556 is located within the base 553.

In addition, each channel can have a proximal end 553 with a proximal aperture 554, where the proximal end 553 is disposed at the end of the body 552 opposite the base 553. Each proximal aperture 554 can transmit an energy wave or other type of signal that originates from a transceiver element and is transmitted through the main channel 555 and the distal aperture 556 to the base 553. In addition, or in the alternative, the proximal aperture 554 can receive an energy wave or other type of signal from an ambient environment (received through the base 553, the distal aperture 556, and the main channel 555) and transmit the energy wave or other type of signal to the transceiver element of a sensor device.

Each body 552 can include a main channel 555 that runs between the proximal aperture 554 at the base 553 and the distal aperture 556 of the distal end 551. The signal guide 550 can have any of a number of channels. In this case, the signal guide 550 has three segments or channels, where each segment (or portion thereof) is designated by a "-#" at the end of each numerical designation. For example, the proximal aperture of segment 3 has a numerical designation of 554-3. A segment can have a single channel (e.g., one proximal aperture 554, one main channel 555, and one distal aperture 556) running therethrough that is devoted the transfer of energy waves or other types of signals with a single sensor. Alternatively, a segment can have multiple channels (e.g., four proximal apertures 554, four main channels 555, and two distal apertures 556) running therethrough, where each channel (or portion thereof) is dedicated to a single sensor device or multiple sensor devices.

When the signal guide 550 has multiple channels, one or more of the channels can be physically separated from the remainder of the segments. In such a case, a gap 546 exists between the segments. Alternatively, when there is no physical separation in the space within a distal end 551 (e.g., distal end 551-2), a body 552 (e.g., body 552-1), and or a base 553 (e.g., base 553-3) of the signal guide 550, the channel 555 (e.g., channel 555-2) can be used to transmit one or more signals from/to one or more transceiver elements of one or more sensors. If the channel 555 is used to transmit signals to/from multiple transceiver elements, then the channel 555 can be a single open space or multiple spaces within the channel 555 that are physically separated from each other.

Using the signal guide 550, the only part of a sensor device that would be visible to a user are the outlet channels 556 of the signal guide 550. As a result, the footprint (and in particular the visible footprint) of the sensor device can be significantly decreased relative to the footprint of sensor devices currently known in the art. In such a case, the proximal apertures 554 of the base 553 can redirect energy waves or other signals emitted by transceiver elements that are spread out in the housing of the sensor device to the main channels 555 and on to the distal apertures 556, which are spaced relatively close together.

The various characteristics (e.g., cross-sectional shape, cross-sectional size, overall shape, overall size, vertical length, overall length, number of proximal apertures, number of main channels, number of distal apertures) of the signal guide 550 (or any portion thereof) can vary. For example, in this case, the cross-sectional shape of the main channels 555 of the signal guide 550 is rectangular and substantially uniform in shape and size along the entire length of the main channels 555. This makes each body 552 appear as an extruded rectangle. Examples of the cross-sectional shape of a channel, including the main channel 555, the distal aperture 556, and/or the proximal aperture 554, can include, but are not limited to, circular, square, triangular, hexagonal, and irregular.

The cross-sectional shape and/or size of a channel (in this case, the main channel 555, the distal aperture 556, and the proximal aperture 554) can vary along its length. Also, the cross-sectional shape and/or size of one channel can be the same as, or different than, the cross-sectional shape and/or size of one or more other channels of the signal guide 550. Also, while the main channel 555, the distal aperture 556, and the proximal aperture 554 of the signal guide 550 of FIGS. 5A and 5B are substantially linear and parallel to each other, one or more of the channels can be non-linear along their length, and/or one or more of the channels can be non-linear with respect to each other.

In addition, or in the alternative, the cross-sectional shape and/or size of a body 552 can vary along its length. Also, the cross-sectional shape and/or size of one body 552 can be the same as, or different than, the cross-sectional shape and/or size of one or more other bodies 552 of the signal guide 550. Similarly, the cross-sectional shape and size of the base 553 can vary. Also, while the body 552 and the base 553 of the signal guide 550 of FIGS. 5A and 5B are substantially linear and parallel to each other, one or more of the bodies 552 and/or the base 553 can be non-linear along their length, and/or one or more of the bodies 552 and the base 553 can be non-linear with respect to each other. In this case, the channels and the corresponding portions (e.g., body 552, base 553, distal end 551) of the signal guide 550 in which the channel is disposed have substantially the same cross-sectional shape.

Figure 6:
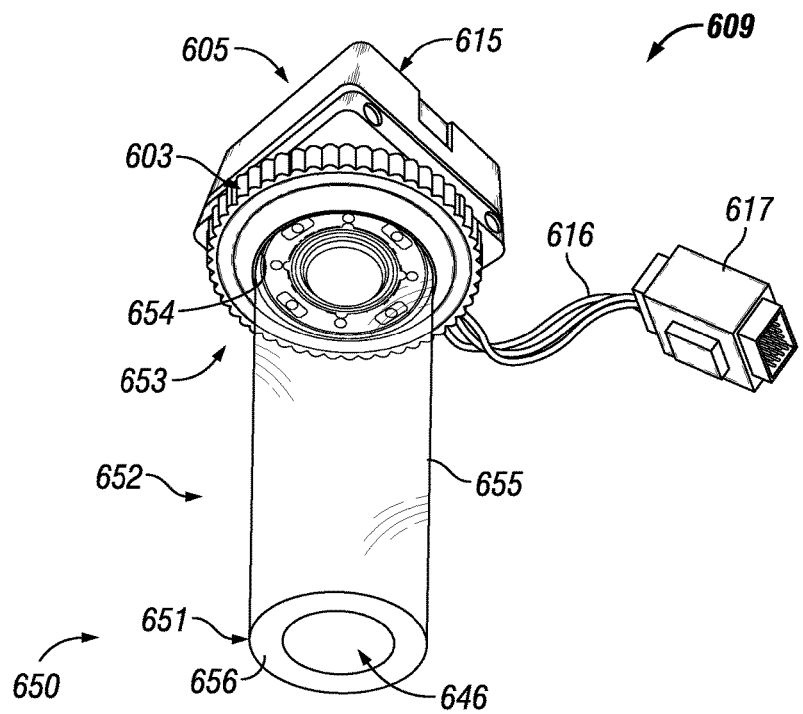
FIG. 6 shows another signal guide for a sensor device.

FIG. 6 shows a bottom-side perspective view of a sensor device 605 that includes another signal guide 650. The sensor device 605 is substantially similar to the sensor devices (e.g., sensor device 205) described above, except for the signal guide 650. The signal guide 650 of FIG. 6 can be substantially similar to the signal guide 550 of FIGS. 5A and 5B, except as described below. In this case, the signal guide 650 is cylindrical in shape with a cavity 646 that traverse the length of the signal guide 650 through the middle of the cylinder. The signal guide 650 of FIG. 6 can include a proximal end that includes at least one proximal aperture 654. The proximal aperture 654 can be continuous along the surface of the base 653. Alternatively, there can be a number of discrete proximal apertures 654 along the surface of the base 653. The proximal aperture(s) 654 can be disposed proximate to the transceiver elements of the sensor device 605.

The signal guide 650 can also include a distal end 651 that includes one or more distal apertures 656. The distal aperture 656 can be continuous along the surface of the distal end 651. Alternatively, there can be a number of discrete distal apertures 656 along the surface of the distal end 651. In addition, the signal guide 650 can include a body 652 that is disposed between the distal end 651 and the base 651. The body 652 can have one or more main channels 655 disposed therein. When there are multiple channels 655, those channels can be physically separated from each other. Alternatively, when there is no physical separation in the space within the distal end 651, the body 652, and or the base 653 of the signal guide 650, the channel 655 can be used to transmit one or more signals from/to one or more transceiver elements of one or more sensors. The main channels 655 provide continuity between a proximal aperture 654 and a distal aperture 656.

In some cases, the only part of the sensor device 605 and the signal guide 650 that would be visible to a user is the outlet channel 656 of the signal guide 650. As a result, the footprint of the sensor device 605 can be significantly decreased relative to the footprint of sensor devices currently known in the art. In this example, the cross-sectional shape of the signal guide 650 is circular and substantially uniform in shape and size along its entire length. The cross-sectional shape and/or size of the signal guide 650 (or any portion thereof) can vary along its length. For example, the cross-sectional shape of the signal guide 650 (or any portion thereof) can be rectangular, square, triangular, or irregular. Also, while the signal guide 650 of FIG. 6 is substantially linear along its length, the signal guide 650 can be non-linear along its length.

Figure 7A:
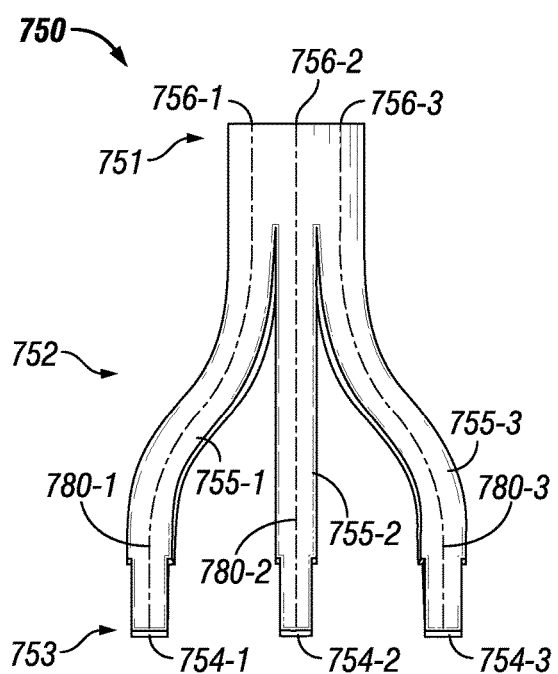
FIGS. 7A and 7B show yet another signal guide for a sensor device.
Figure 7B:
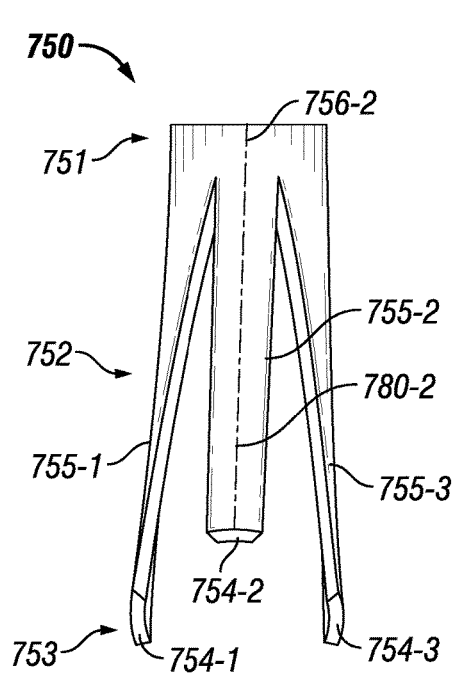
Figure 8A:
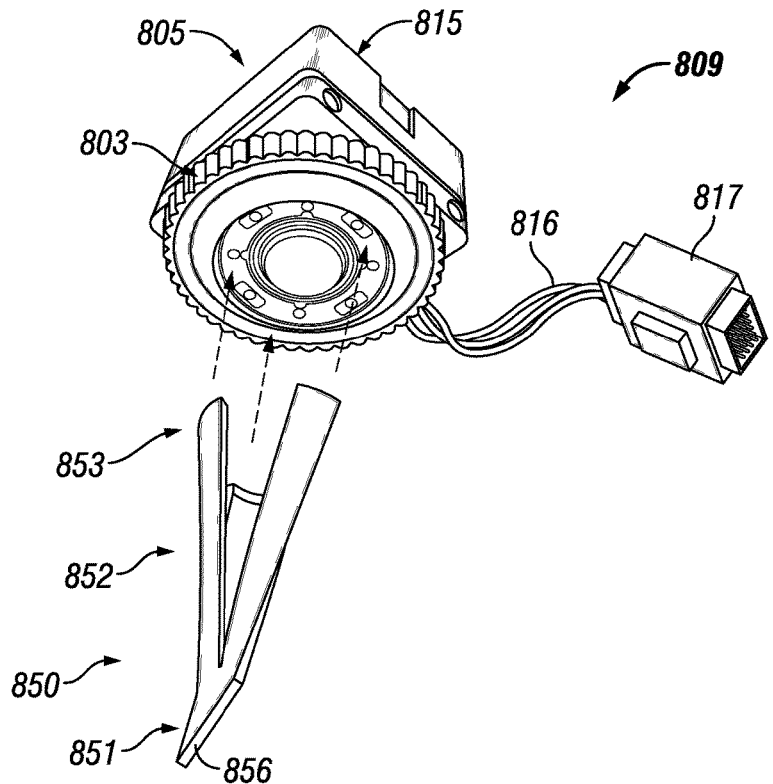
FIGS. 8A and 8B show a sensor device with a signal guide.
Figure 8B:
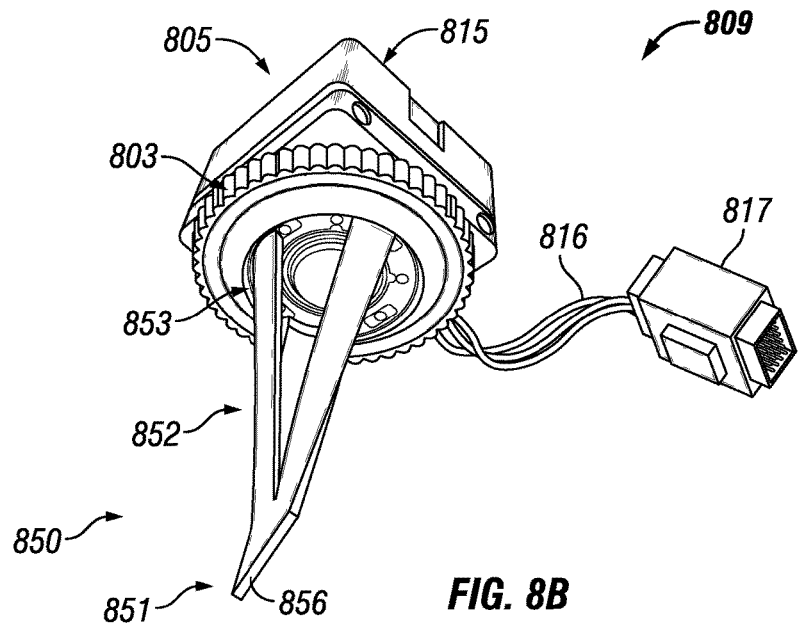
Figure 9C:
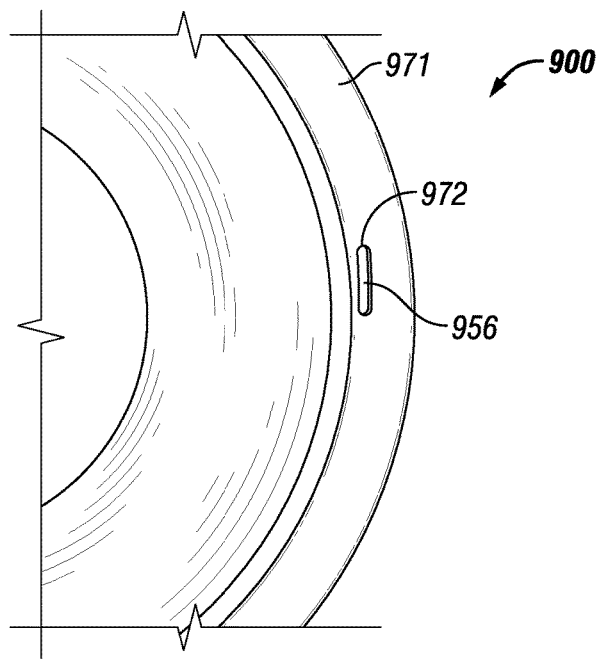

FIGS. 7A-9C show yet another embodiment of a sensor guide 750. Specifically, FIG. 7A shows a side view of a flattened signal guide 750 for a sensor device. FIG. 7B shows a bottom-side perspective view of the signal guide 750 of FIG. 7A that is shaped. FIGS. 8A and 8B each show a bottom-side perspective view of a sensor device 805 that includes a signal guide 850. FIGS. 9A-9C show an electrical device 900 that includes a sensor device 905 (substantially similar to the sensor devices described above) with a signal guide 950.

The signal guide 850 of FIGS. 8A and 8B, the signal guide 750 of FIGS. 7A and 7B, and the signal guide 950 of FIGS. 9A-9C can be substantially similar to the signal guide 530 of FIGS. 5A and 5B and the signal guide 640 of FIG. 6, as well as to each other, except as described below. In addition, aside from the signal guides, the sensor device 805 of FIGS. 8A and 8B and the sensor device 905 of FIGS. 9A-9C are substantially the same as the sensor devices described above. Referring to FIGS. 1A-9C, the signal guide 750 of FIGS. 7A and 7B has a base 753 that is configured to be disposed proximate to the circuit board assembly. Specifically, the base 753 at the proximal end of the signal guide 750 can be disposed adjacent to one or more of the transceiver elements mounted on the circuit board assembly of the sensor device. In this case, the base 753 has a number of proximal apertures 754, where each proximal aperture (e.g., 754-1) is placed adjacent to a transceiver element of the sensor device and receives an energy (e.g., light, sound) wave from the transceiver element.

The signal guide 750 can also include a body 752, located between the base 753 and the distal end 751 of the signal guide 750, where the body includes one or more segments that extend from the base 753. Each segment can have a main channel 755 that extends from the corresponding proximal aperture 754 of the base 753. At the distal end 751 of the body 752 of the signal guide 750, one or more of the main channels 755 merge to form one or more distal apertures 756. In this case, the base 753 of the signal guide 750 has three proximal apertures 754 and three main channels 755, where each proximal aperture 754 and corresponding main channel 755 is designated by a "-#" at the end of each numerical designation. For example, the second proximal aperture has a numerical designation of 754-2.

A proximal aperture 754, a main channel 755, and a distal aperture 756 can form a single continuous channel 780. In this case, proximal aperture 754-1, main channel 755-1, and distal aperture 756-1 forms channel 780-1; proximal aperture 754-2, main channel 755-2, and distal aperture 756-2 forms channel 780-2; and proximal aperture 754-3, main channel 755-3, and distal aperture 756-3 forms channel 780-3. A continuous channel 780 can remain isolated from any other channel 780 of the signal guide 750 along the entire length of the channel 780. Alternatively, a portion (e.g., the distal aperture 756) of a channel 780 can be shared with a corresponding portion of another channel 780 of a signal guide 750.

When multiple main channels 755 merge at the distal end 751, the merger can result in a single distal aperture 756. Alternatively, the merger of multiple main channels 755 at the distal end 751 of the signal guide 750 can result in a more consolidated configuration of the multiple main channels 755 to form the same number of multiple distal apertures 756 at the distal end 751. For example, in this case, distal aperture 756-1, distal aperture 756-2, and distal aperture 756-3, which correspond to main channel 755-1, main channel 755-2, and main channel 755-3, respectively, are located adjacent to each other in a line at the distal end 751 of the signal guide 750 of FIGS. 7A and 7B.

The signal guide 850 of FIGS. 8A and 8B is substantially the same as the shaped signal guide 750 of FIG. 7B. In FIGS. 8A and 8B, the subsystem 809 includes a signal guide 850 and a sensor device 805. The distal end 851 of the signal guide 850 is shown as having a single distal aperture 856. Alternatively, signal guide 850 can have multiple distal apertures 856. For example, there can be one distal aperture 856 for each main channel 855, where the multiple distal apertures 856 are aligned in a row so that the distal end 851 of the signal guide 850 forms a linear segment.

The signal guide 950 of FIGS. 9A-9C is substantially the same as the signal guide 850 of FIGS. 8A and 8B, except that the main channels (main channel 955-1, main channel 955-2, and main channel 955-3) of the body 952 have more curvature than the main channels of the body of the signal guide 850. In FIGS. 9A-9C, all of the sensor device 905, including the signal guide 950, is located behind the trim 971 of the electrical device 900. Further, the distal aperture 956 of the signal guide 950 is disposed within a slot 972 that traverses the trim 971 of the electrical device 900. The shape and size of the slot 972 can be substantially the same as the shape and size of the distal aperture 956. As a result, none of the sensor 900 except for the outlet channel 956 is visible by a user when the electrical device 900 is installed.

This example of FIGS. 9A-9C highlights some advantages of using these sensor guides. First, the size of the sensor device 900 is much less relevant because the sensor device 900 is located where substantial space exists. Consequently, a sensor device 900 of any size (and having any of a number of transceiver elements) can be used with the electrical device 900. Second, none of the sensor device 900 is visible by a user when the electrical device is installed, and so there are no issues with aesthetics. Finally, some signal guides, such as signal guide 950, can be bi-directional, allowing energy waves to flow both from a transceiver element and to a transceiver element (or some other component of the electrical device).

Figure 10A:
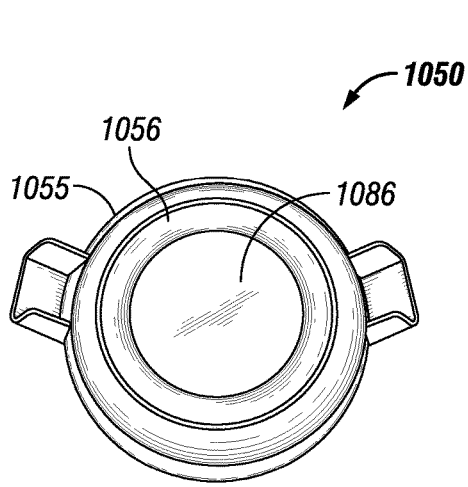
FIGS. 10A and 10B show another sensor device with a signal guide.
Figure 10B:
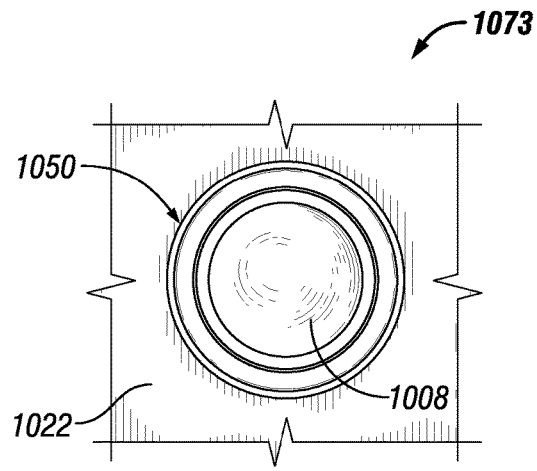
Figure 11:
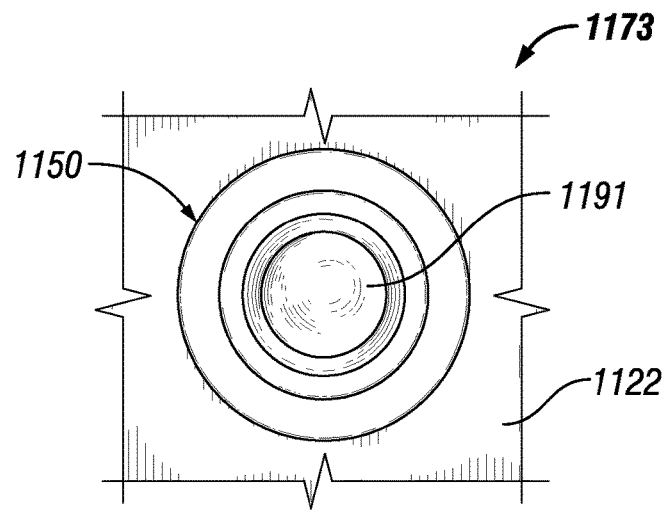
FIG. 11 shows yet another sensor device with a signal guide.
Figure 12:
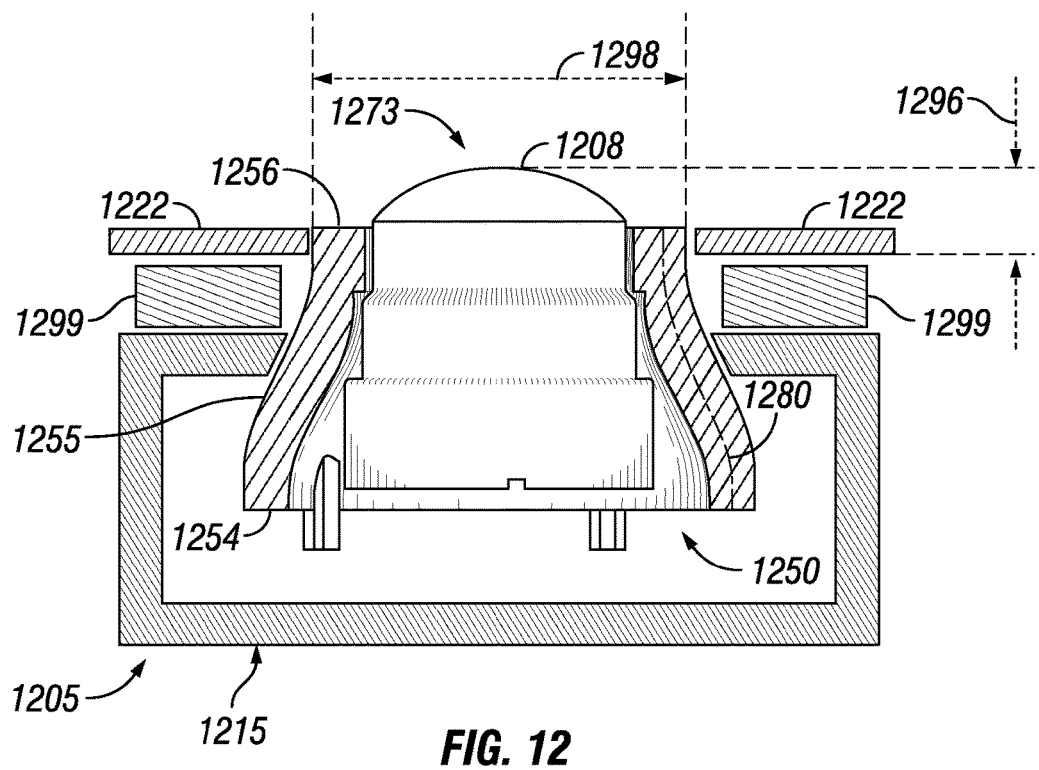
FIG. 12 shows the sensor of FIGS. 10A and 10B mounted in a surface.

FIGS. 10A-12 show another example where the sensor device is partially visible (as with FIGS. 1A-4B), but where the footprint of the visible portion of the sensor device is significantly less than what can be accomplished in the current art. FIG. 10A shows a top view of a signal guide 1050 of a sensor device. FIG. 10B shows a top view of a distal assembly 1073, including the signal guide 1050 of FIG. 10A, of a sensor device. FIG. 11 shows a top view of a distal assembly 1190, including a signal guide 1180, of a sensor device. FIG. 12 shows a cross-sectional side view that details sensor device 1205 disposed on an outer panel 1222 of an electrical device 1292.

Referring to FIGS. 1A-12, the signal guide 1050 of FIG. 10A has one or more main channels 1053 that are non-linear. In other words, the one or more distal apertures 1056 at the distal end of the main channels 1055 of the signal guide 1050 are spaced adjacent to the aperture 1086 disposed in the middle of the signal guide 1050, where the radius of the distal apertures 1056 is smaller than the radius of the proximal apertures (hidden from view in FIG. 10A, but shown as proximal apertures 1254 in FIG. 12) disposed at the proximal end of the main channels 1055.

Put another way, the signal guides of FIGS. 10A-12 can be modified version of the signal guide 650 of FIG. 6, where the distal end of the signal guides in FIGS. 10A-12 are squeezed inward (e.g., smaller diameter), thus creating a smaller profile. Thus, energy waves that travel through the signal guide 1050 travel in a non-linear path. Again, as shown in FIGS. 10B-12, this greatly reduces the footprint of the distal assembly (distal assembly 1073 in FIG. 10B, distal assembly 1173 in FIG. 11, and distal assembly 1273 in FIG. 12) that is visible to a user.

FIG. 11 shows an alternative sensor device where the occupancy sensor (including the occupancy sensor housing 1008 shown in FIG. 10B) is replaced by a camera 1191. FIG. 12 shows an example of how the sensor device 1205 can be mounted to an electrical device 1292. In this case, the sensor device 1205 does not have a trim (such as trim 404 in FIG. 4B above). Instead, a coupling device 1299 (e.g., double-sided tape, adhesive, epoxy, cement, glue) can be used to secure the housing 1215 of the sensor device 1205 to the inner-facing surface of the outer panel 1222 of the electrical device 1292. Without the trim, the footprint of the distal assembly 1273 is greatly reduced compared to the footprint of the distal assembly 403 of FIG. 4B above.

Specifically, the distal aperture 1256 of the signal guide 1250 has a width 1298 (e.g., 0.5 inches) and a height 1296 (e.g., 0.15 inches). The width 1298 of the distal aperture 1256 of the signal guide 1250 is less than the width of the cover 401 of FIG. 4B above. In other words, the bell-shape of the signal guide 1250 (and so also of each continuous channel 1280 of which the distal aperture 1256 is a part) allows for a smaller visible footprint for a sensor device. In addition, the shape and/or size of portions of a sensor device that would currently be too large to be used with an electrical device can be used because of the smaller footprint and/or the flexibility in placement of the sensor device.

Figure 13A:
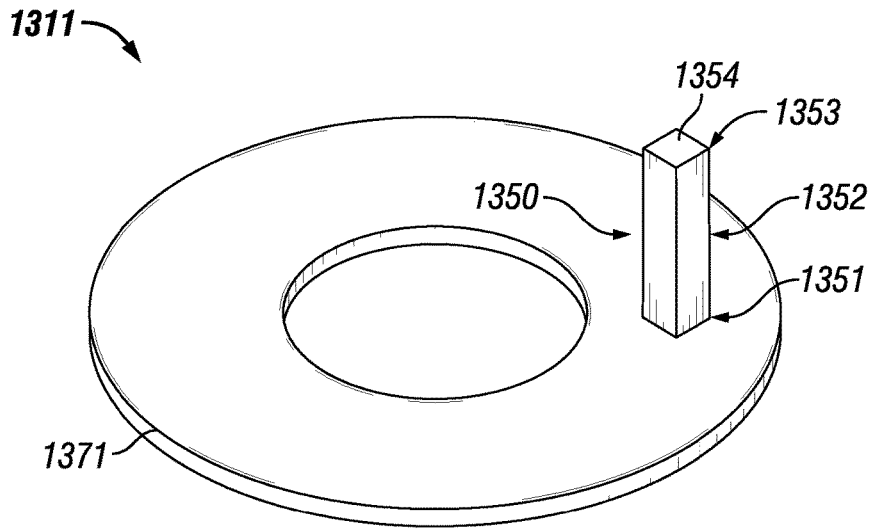
FIGS. 13A and 13B show various views of still another signal guide.
Figure 13B:
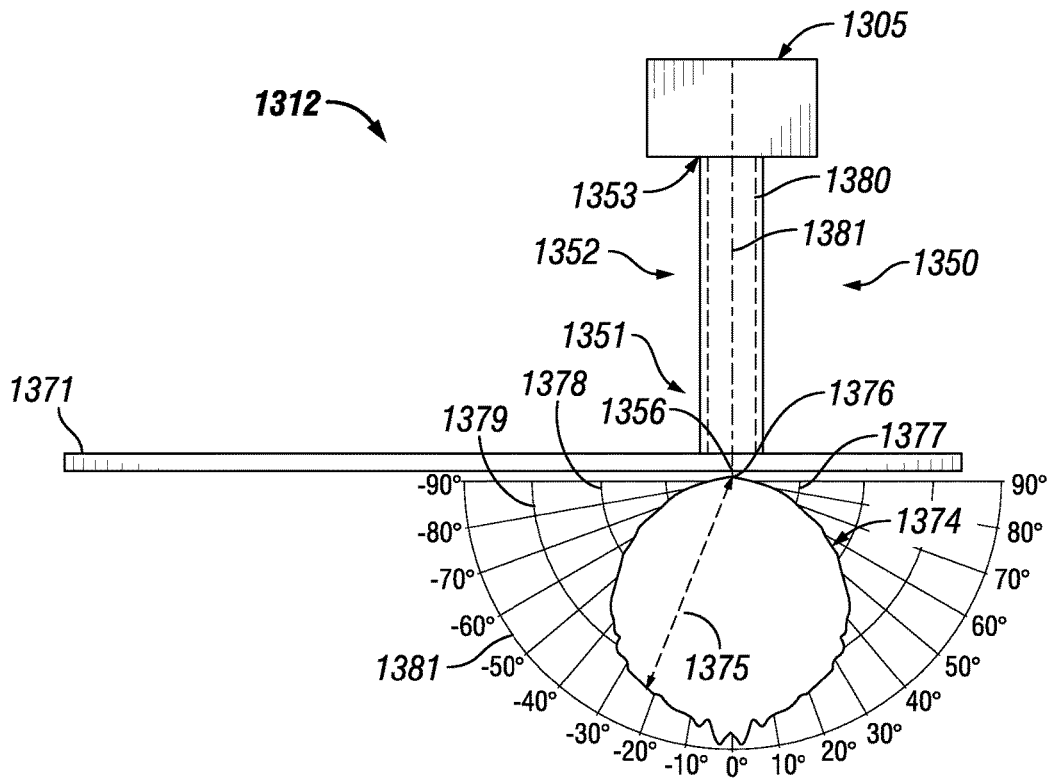

FIGS. 13A and 13B show various views of still another signal guide 1350. FIG. 13A shows a top-side perspective view of a subassembly 1311 that includes an example signal guide 1350 disposed on the trim 1371 of an electrical device (e.g., a light fixture). FIG. 13B shows a side view of a subassembly 1312 that includes the example signal guide 1350 disposed on the trim 1371, as well as a sensor device 1305 and a field of angular distribution 1374.

The channel 1380 of the signal guide 1350 in this case is in the form of an extruded square. In other words, the channel 1380 of the signal guide 1350 of FIGS. 13A and 13B has a cross-sectional shape of a square that is substantially uniform along its length. The channel 1380 of the signal guide 1350 of FIGS. 13A and 13B can have a single proximal aperture 1354 or multiple proximal apertures 1354 at the base 1353. Further, the signal guide 1350 can have a single main channel 1380 (as in this case) or multiple main channels of the body 1352. In addition, there can be a single distal aperture 1356 or multiple distal apertures 1356 at the distal end 1351 of a channel 1380 of the signal guide 1350. In this example, the channel 1380 has a single proximal aperture 1354, a single main channel, and a single distal aperture 1356.

The sensor device 1305 is disposed adjacent to the proximal aperture 1354 of the base 1353 of the signal guide 1350 to detect signals (e.g., light waves, microwaves, images) that are transmitted through the distal aperture 1356, followed by the main channel, followed by the proximal aperture 1354 of the channel 1380 of the signal guide 1350 and/or to transmit signals through the proximal aperture 1354, followed by the main channel, followed by the distal aperture 1356 of the channel 1380 of the signal guide 1350.

The field of angular distribution 1374 of FIG. 13B shows the range of intensity 1375 in which signals can be transmitted from the sensor device 1305 through the signal guide 1350 and/or received by the sensor device 1305 through the signal guide 1350. In this case, the term "range" can refer to a range of angles using a polar coordinate system. In some cases, such as in this example, the range is centered around 0°. More specifically, in this example, the range is −90° to +90° with 0° aligning with the center axis 1381 along the length of the channel 1380 within the signal guide 1350. The center point 1376 of the polar plot of the field of angular distribution 1374 is located substantially at the distal aperture 1356, In FIG. 13B, the field of angular distribution 1374 is substantially circular in shape. Specifically, the intensity 1375 is de minimis between −90° and −80°, and between 80° and 90°. The intensity 1375 is approximately 25% (denoted by grid line 1377) at approximately −70° and 70°. The intensity 1375 is approximately 50% (denoted by grid line 1378) at approximately −55° and 55°. The intensity 1375 is approximately 75% (denoted by grid line 1379) at approximately −35° and 35°. The intensity 1375 is approximately 100% (denoted by grid line 1381) at between approximately −3° and 3°.

Figure 14A:
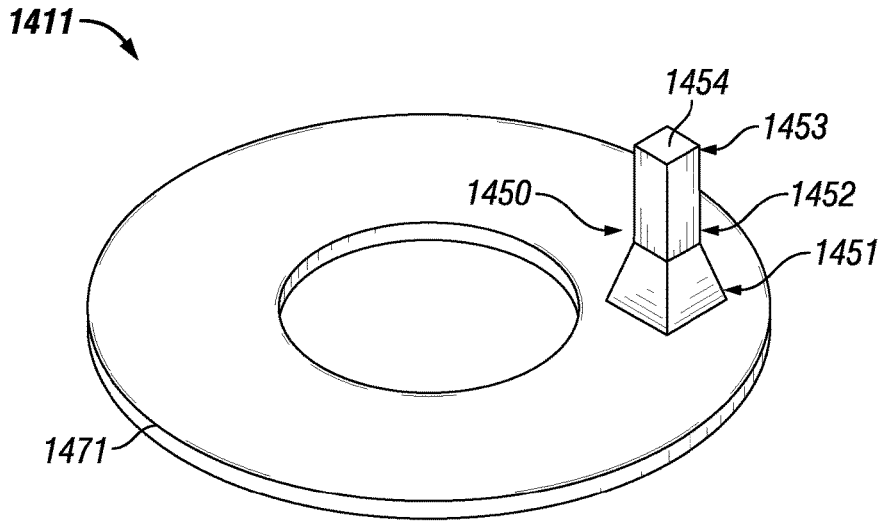
FIGS. 14A and 14B show various views of a signal guide in accordance with certain example embodiments.
Figure 14B:
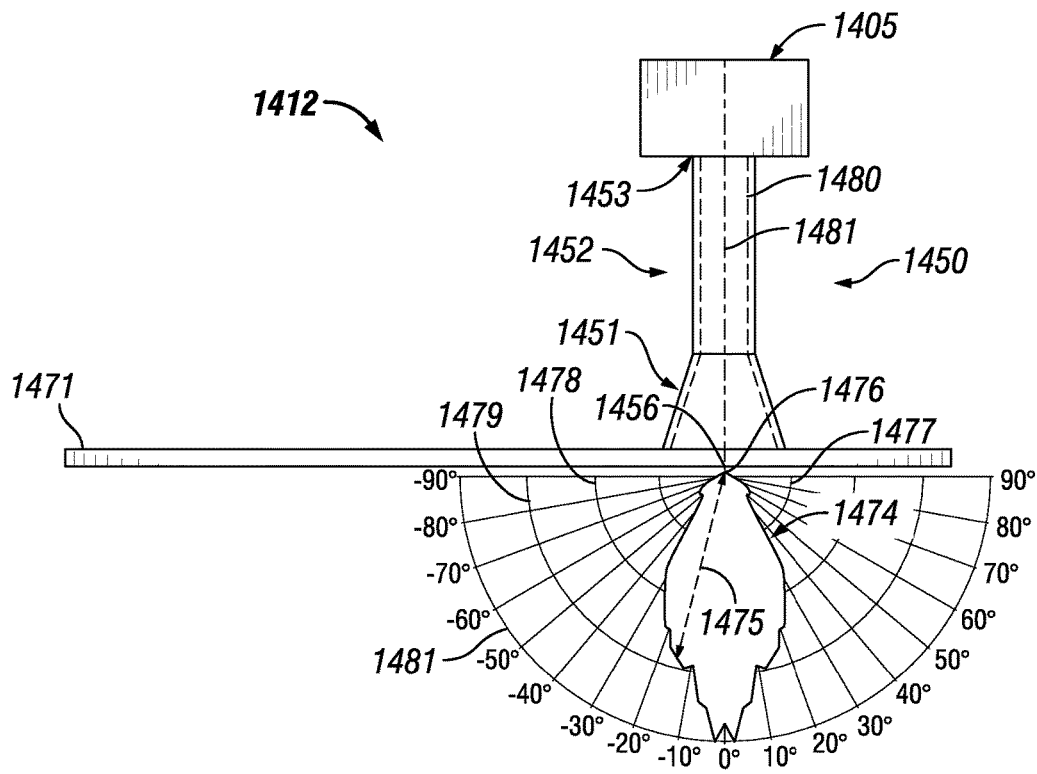

For all of the signal guides discussed above, including the signal guide 1350 of FIGS. 13A and 13B, each channel has a substantially uniform cross-sectional shape and size along the length of the channel. In such cases, the signal (e.g., light wave) transmitted through the channel is not controlled. Specifically, the field of angular distribution is not be specifically tailored (e.g., widened, narrowed, elongated, shortened, made symmetrical, made asymmetrical) for a particular application. By contrast, using example embodiments, the signal transmitted through a channel of a signal guide can be controlled to give the field of angular distribution one or more particular properties. For example, as shown in FIGS. 14A and 14B, by altering one or more characteristics (e.g., cross-sectional shape, with or without being combined with length, width, and/or curvature) of the signal guide, one or more characteristics (e.g., width of the field of angular distribution 1474, shape of the field of angular distribution 1474, range) of the field of angular distribution associated with the signal guide can be altered. In this way, the characteristics of an example signal guide can be tailored for a specific application and/or for a specific sensing device.

FIGS. 14A and 14B show various views of yet another signal guide 1450 in accordance with certain example embodiments. FIG. 14A shows a top-side perspective view of a subassembly 1411 that includes an example signal guide 1450 disposed on the trim 1471 of an electrical device (e.g., a light fixture). FIG. 14B shows a side view of a subassembly 1412 that includes the example signal guide 1450 disposed on the trim 1471, as well as a sensor device 1405 and a field of angular distribution 1474.

The subassembly 1411 of FIG. 14A and the subassembly 1412 of FIG. 14B are substantially the same as the subassembly 1311 of FIG. 13A and the subassembly 1312 of FIG. 13B, respectively, except as described below. Specifically, While the body 1452 of the signal guide 1450 is in the form of an extruded square, the distal end 1451 has a varying size along its length. The portion of the distal end 1451 that is adjacent to the body 1452 has the same cross-sectional shape and size as the cross-sectional shape and size of the body 1452. Traveling down the distal end 1451 toward the trim 1471, the cross-sectional shape of the distal end 1451 remains the same, but the cross-sectional size of the distal end 1451 increases. In this case, the cross-sectional size of the distal end 1451, in terms of the outer perimeter of the distal end 1451, increases in a linear manner.

When this occurs, the field of angular distribution 1474 of the signal guide 1450 varies relative to the field of angular distribution 1374 of the signal guide 1350. In this case, by increasing the cross-sectional size of the distal end 1451 relative to the body 1452 of the signal guide 1450, the field of angular distribution 1474 is more narrow than the field of angular distribution 1374 associated with the signal guide 1350 of FIGS. 13A and 13B. While the field of angular distribution 1474 of FIG. 14B (like the field of angular distribution 1374 of FIG. 13B) is symmetrical about 0°, the field of angular distribution 1474 of FIG. 14B is elongated (not circular).

In this case, the intensity 1475 is de minimis between −90° and −50°, and between 50° and 90°. The intensity 1475 is approximately 25% (denoted by grid line 1477) at approximately −35° and 35°. The intensity 1475 is approximately 50% (denoted by grid line 1478) at approximately −28° and 28°. The intensity 1475 is approximately 75% (denoted by grid line 1479) at approximately −13° and 13°. The intensity 1475 is approximately 100% (denoted by grid line 1481) at between approximately −3° and 3°. The maximum intensity 1475 of the field of angular distribution 1474 of FIG. 14B can be greater than, the same as, or less than the maximum intensity 1375 of the field of angular distribution 1374 of FIG. 13B, depending on the characteristics (e.g., cross-sectional shape, cross-sectional size) of the channel 1480 along the length of the channel.

By changing various characteristics of the channel 1480, the field of angular distribution can be altered in one or more of a number of ways. For example, by gradually decreasing the cross-sectional size of the channel 1480 at the distal end 1451 relative to the cross-sectional size of the channel 1480 at the body 1452 of the signal guide 1450, the field of angular distribution 1474 can have one or more different characteristics (e.g., made wider). In addition, or in the alternative, the field of angular distribution 1474 can be altered by changing the cross-sectional shape of the channel 1480 at the distal end 1451 relative to the cross-sectional shape of the channel 1480 at the body 1452. Further, in addition or in the alternative to the channel 1480 at the distal end 1451, the cross sectional shape and/or size of the channel 1480 at the body 1452 and/or the channel 1480 at the base 1453 can be changed along their respective lengths.

Further, rather than linear changes to the cross-sectional size of a portion of the channel 1480 at the signal guide 1450, in terms of the outer perimeter of that portion of the channel 1480 at the signal guide 1450, a change can transition in one or more of number of other ways, including but not limited to convex curvature, concave curvature, random, and sawtooth. In addition, the various embodiments described above with respect to modifying the signal guide 1450 to change the field of angular distribution 1474 can be applied to a single channel 1480 (or portion thereof), such as the proximal aperture 1454, the distal aperture 1456, and/or the main channel 1455) within a signal guide rather than to the entire signal guide. Alternatively, if a signal guide 1450 has multiple channels 1480, then one or more of those channels 1480 can be altered according to example embodiments to generate a desired field of angular distribution 1474.

Figure 15A:
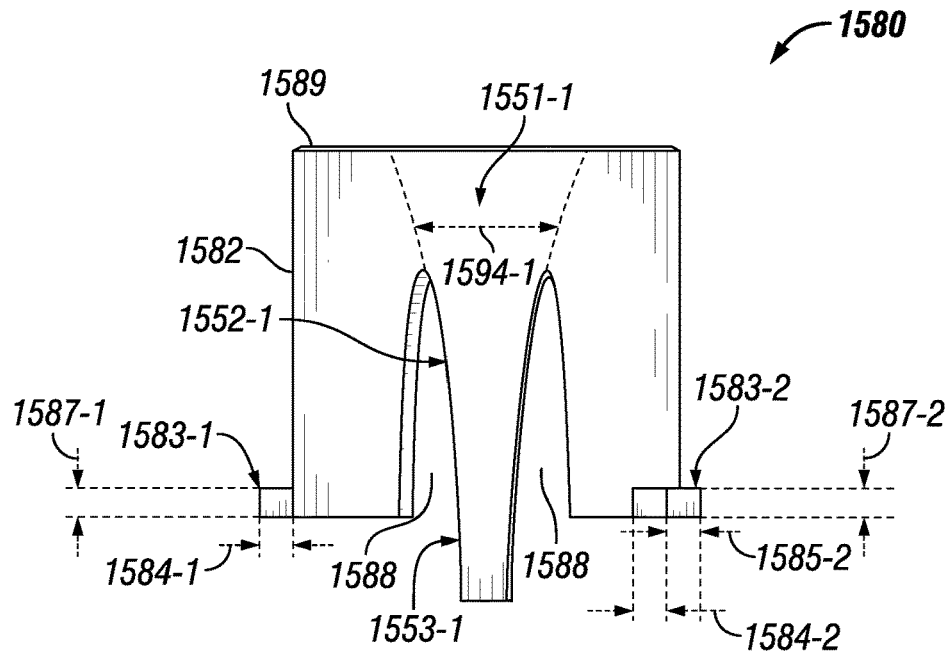
FIGS. 15A-15C show various views of another signal guide in accordance with certain example embodiments.
Figure 15B:
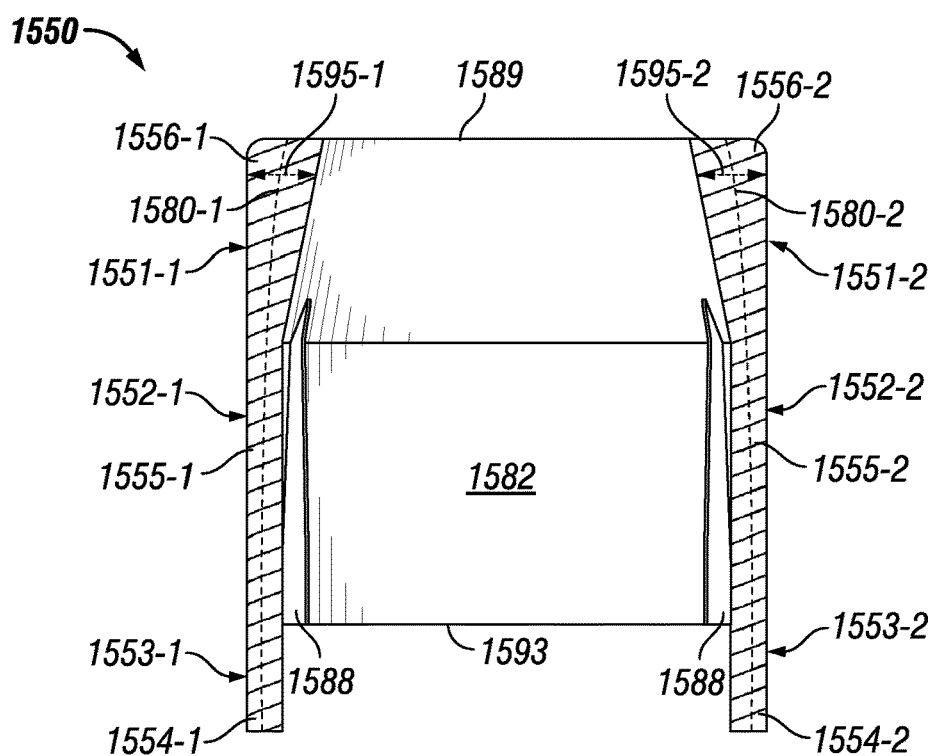
Figure 15C:
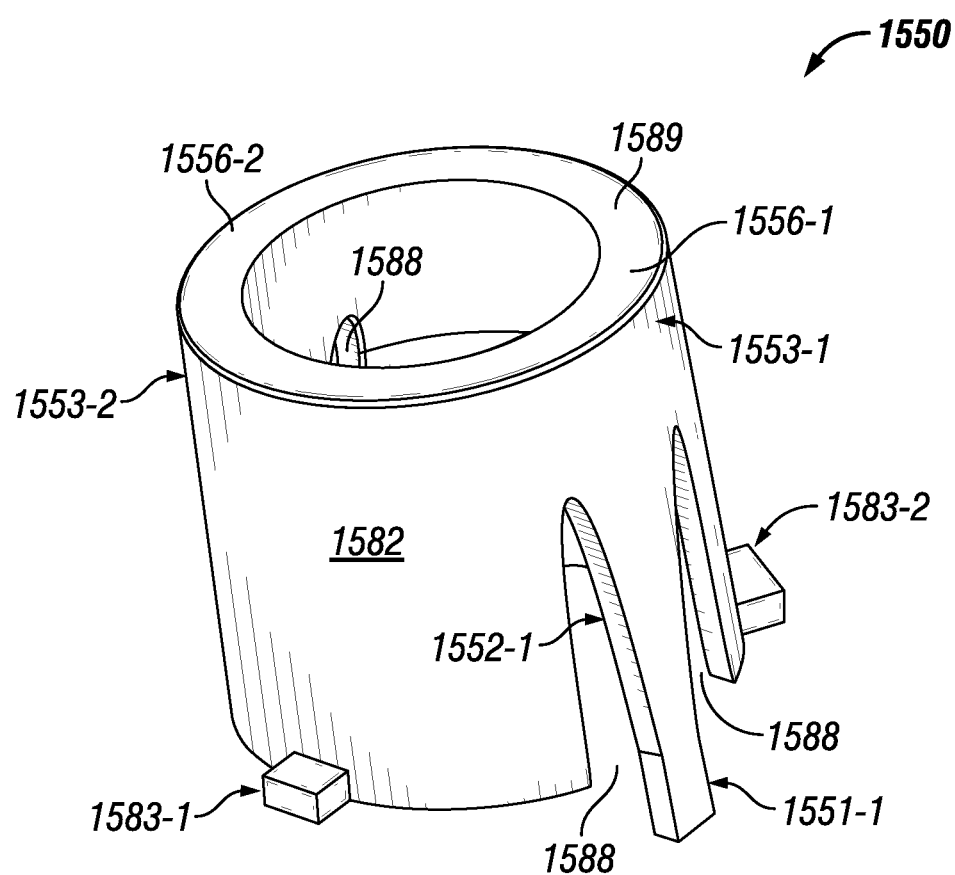

FIGS. 15A-15C show various views of another signal guide 1550 in accordance with certain example embodiments. Specifically, FIG. 15A shows a side view of the signal guide 1550. FIG. 15B shows a cross-sectional front view of the signal guide 1550. FIG. 15C shows a top-side-front perspective view of the signal guide 1550. In this case, there are two continuous channels 1580 (channel 1580-1 and channel 1580-2) that traverse the height of the signal guide 1550. Channel 1580-1 and channel 1580-2 are completely isolated from each other. In other words, channel 1580-1 and channel 1580-2 may not share any of their channel portions with each other.

In this case, the signal guide 1550 is substantially cylindrically shaped. Channel 1580-1 and channel 1580-2 are disposed, at least in part, within the body 1582 of the signal guide 1550 and are located substantially opposite each other. In this case, channel 1580-1 and channel 1580-2 are longer than the height of the body 1582 of the signal guide 1550, so that the base 1553 of each channel 1580 extends below the bottom surface 1593 of the body 1582 of the signal guide 1550. In this case, the distal end 1551 of each channel 1580 terminates on substantially planar with the top surface 1589 of the body 1582 of the signal guide 1550.

As stated above, each channel 1580 of FIGS. 15A-15C is isolated from the other channels. In this case, the body 1582 of the signal guide 1550 is disposed between the channels 1580. In certain example embodiments, as in this case, there is one or more optional gaps 1588 between a channel 1580 and the body 1582 of the signal guide 1550. Here, there is a gap 1588 on either side of a channel 1580, and each gap 1588 helps define the increasing size of the cross-sectional shape of the channel 1580 from the proximal aperture 1554 to the main channel 1555 and on to the distal aperture 1556.

The shape and size of channel 1580-1 is substantially the same as the shape and size of channel 1580-2. Each channel 1580 of the signal guide 1550 has a width 1594 and a depth 1580. As can be seen in FIGS. 15A-15C, the depth 1580 is substantially uniform until about two-thirds up the channel 1580 from the base 1553, at which point the depth 1580 increases substantially linearly to the end of the distal end 1551. By contrast, the width 1594 is substantially uniform until about one-third up the channel 1580 from the base 1553, at which point the width 1594 increases substantially linearly to the end of the distal end 1551.

In certain example embodiments, the signal guide 1550 can include one or more positioning features 1583 that help orient the channels 150 of the signal guide 1550 with respect to a transceiver element of a sensor device. A positioning feature 1583 can have one or more of any of a number of forms, including but not limited to a tab (as shown in FIGS.

15A-15C), a slot, a detent, a recess, a protrusion, and an aperture. If a signal guide 1550 has multiple positioning features 1583, one positioning feature 1583 can be the same as, or different than, one or more of the other positioning features 1583 of the signal guide 1550.

Each positioning feature 1583 of the signal guide 1550 can be disposed at any of a number of locations on the signal guide 1550. For example, the two positioning features 1583 (positioning feature 1583-1 and positioning feature 1583-2) of the signal guide 1550 of FIGS. 15A-15C extend outward from the body 1582 adjacent to and substantially planar with the bottom surface 1593. The two positioning features 1583 of FIGS. 15A-15C are not symmetrically disposed about the signal guide 1550 when viewed from above.

Figure 16A:
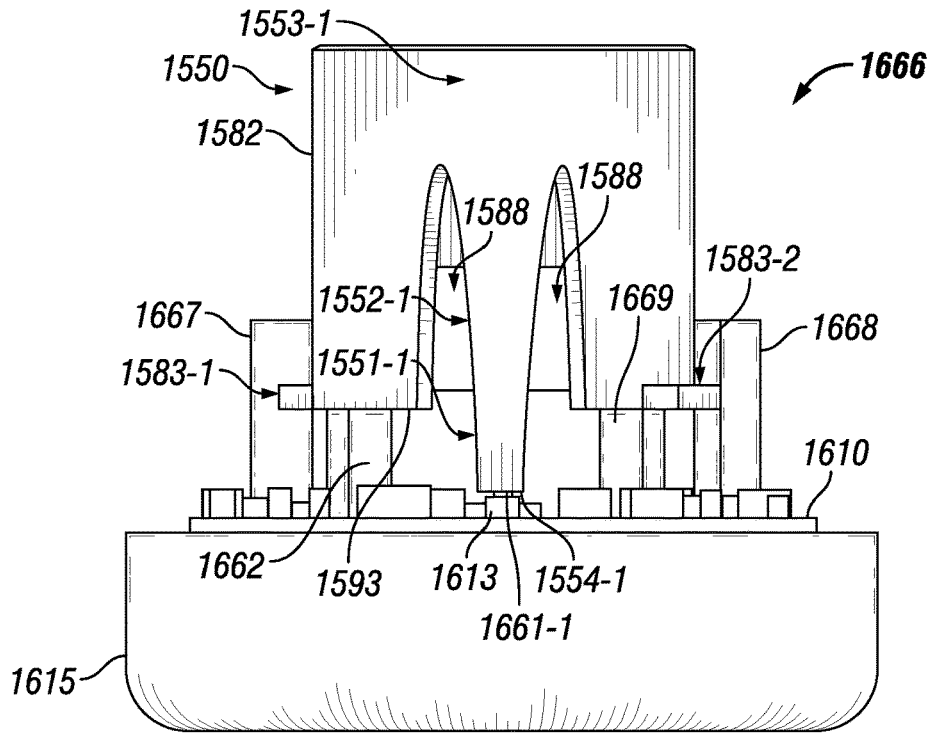
FIGS. 16A and 16B show a subassembly that includes the example signal guide of FIGS. 15A-15C in accordance with certain example embodiments.
Figure 16B:
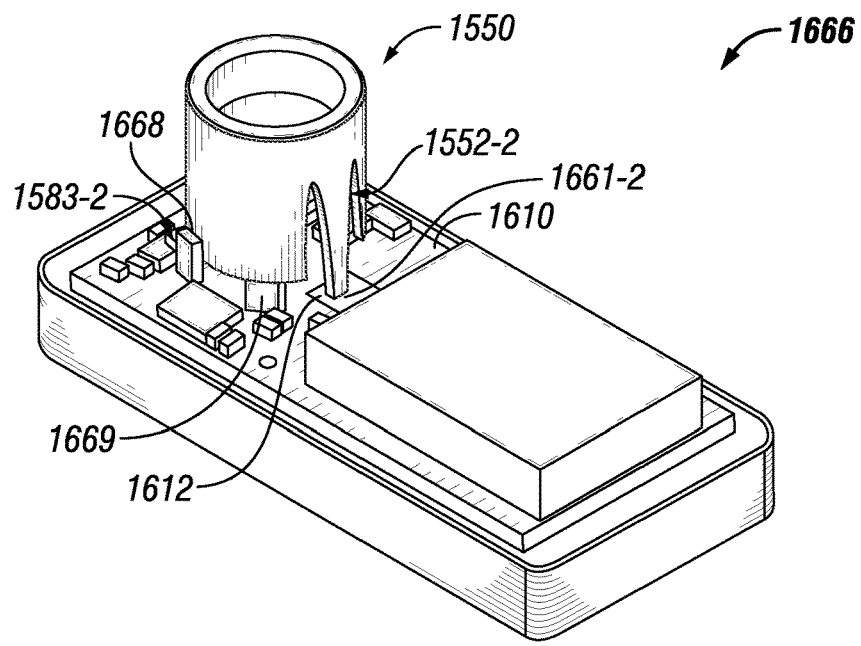

Each positioning feature 1583 can have dimensions (e.g., a height 1587, a length 1584, a width 1585) that are designed to interact with (e.g., abut against, couple to, be disposed on) one or more features (e.g., standoff, capacitor, transceiver element, housing) of a sensor device. An example of this is shown in FIGS. 16A and 16B below. In certain example embodiments, a positioning feature 1583 can form a single piece (as from a mold) with the body 1582 and/or other portion (e.g., outer surface of a base 1553) of the signal guide 1550. In this way, the location of the positioning feature 1583 on the signal guide 1550 can be permanently affixed, as from, for example, a mold, extrusion process, fusion, or a compression fitting.

Alternatively, a positioning feature 1583 can be movable relative to a portion of the signal guide 1550. In such a case, a positioning feature 1583 can be removably coupled, directly or indirectly, to a portion of the signal guide 1550, As a result, a positioning feature 1583 can include one or more coupling features that couple to one or more complementary coupling features of a portion (e.g., body 1582) of the signal guide 1550. A coupling feature can include, but is not limited to, a portion of a hinge, an aperture, a recessed area, a protrusion, a clamp, a slot, a spring clip, a tab, a detent, and mating threads. One portion of a positioning feature 1583 can be coupled to a portion of the signal guide 1550 by the direct use of one or more coupling features.

In addition, or in the alternative, a portion of a positioning feature 1583 can be coupled to a portion of the signal guide 1550 using one or more independent devices that interact with one or more coupling features. Examples of such devices can include, but are not limited to, a pin, a hinge, a fastening device (e.g., a bolt, a screw, a rivet), a clamp, epoxy, adhesive, and a spring. One coupling feature described herein can be the same as, or different than, one or more other coupling features described herein. A complementary coupling feature as described herein can be a coupling feature that mechanically couples, directly or indirectly, with another coupling feature.

FIGS. 16A and 16B show a sensor device subassembly 1666 that includes the example signal guide 1550 of FIGS. 15A-15C in accordance with certain example embodiments. Specifically, FIG. 16A shows a side view of the subassembly 1666, and FIG. 16B shows a top-rear-side perspective view of the subassembly 1666. The subassembly 1666 includes part of the housing 1615 of the sensor device, upon which a circuit board 1610 is disposed. A number of components are connected to the top surface of the circuit board 1610, including an infrared detector 1612 (with an associated transceiver element 1661-1), a LED assembly 1613 (with an associated transceiver element 1661-2, which in this case is a LED), component 1662, component 1667, component 1668, and component 1669. A component (e.g., component 1662, component 1667) disposed on the circuit board 1610 can be any of a number of devices, including but not limited to a resistor, a capacitor, a standoff, a capacitor, an integrated circuit, a housing, a shield, a heat sink fin, a reflector, a barrier, and an inductor.

In certain example embodiments, the signal guide 1550 is disposed on and/or against one or more of the components of the sensor device. For example, in this case, the bottom surface 1593 of the body 1582 of the signal guide 1550 is disposed on top of component 1662 and component 1669. In addition, in this case, a side of positioning guide 1583-1 abuts against component 1667, and a side of positioning guide 1583-2 abuts against component 1668. In other words, component 1662, component 1667, component 1668, and component 1669 are positioned in such a way as to specifically position the proximal apertures 1554 of the signal guide 1550 in a particular way (e.g., vertical distance, overall distance, offset, angle) relative to the transceiver elements 1661.

As discussed above, one or more of the positioning guides 1583 of the signal guide 1550 can be repositioned vertically and/or horizontally with respect any portion (e.g., body 1582) of to the signal guide 1550. This can be done by a user in order to accommodate the signal guide 1550 to a particular arrangement of components on the circuit board (e.g., circuit board 1610) of a sensor device. This user adjustability of the positioning guides 1583 makes the example signal guide 1550 retrofitable for any of a number of existing sensor devices.

Example embodiments provide a number of benefits. Examples of such benefits include, but are not limited to, a defined field of angular distribution, reduction in visible footprint; more simplistic installation, replacement, modification, and maintenance of a sensor device; improved aesthetics; ability to transmit energy waves in two directions rather than just one direction; compliance with one or more applicable standards and/or regulations; lower maintenance costs, increased flexibility in system design and implementation; and reduced cost of labor and materials. Example embodiments can be used for installations of new electrical devices and/or new sensor devices. Example embodiments can also be integrated (e.g., retrofitted) with existing electrical devices and/or sensor devices.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A signal guide for a sensor device, the signal guide comprising:
   a base comprising a first proximal aperture, wherein the first proximal aperture has a first cross-sectional profile, wherein the first proximal aperture is configured to be disposed proximate to a first transceiver element of the sensor device;
   a body disposed adjacent to the base, wherein the body comprises a first main channel that adjoins the first proximal aperture;

a distal end disposed adjacent to the body opposite the base, wherein the distal end comprises a first distal aperture that adjoins the first main channel, wherein the first distal aperture has a second cross-sectional profile, wherein the first distal aperture is configured to be disposed proximate to an ambient environment; and at least one gap that traverses at least a portion of the body, wherein the at least one gap is used, in part, to form variations in a first main channel cross-sectional profile of the first main channel, wherein the first proximal aperture, the first main channel, and the first distal aperture form a first continuous channel, wherein the first cross-sectional profile is different than the second cross-sectional profile, and wherein the first continuous channel is configured to transfer signals between the first transceiver element of the sensor device and the ambient environment.

2. The signal guide of claim 1, wherein the first cross-sectional profile is smaller than the second cross-sectional profile.

3. The signal guide of claim 1, wherein the first cross-sectional profile comprises a square having a first outer perimeter.

4. The signal guide of claim 3, wherein the second cross-sectional profile comprises a rectangle having a second outer perimeter.

5. The signal guide of claim 1, wherein the first main channel has the first cross-sectional profile.

6. The signal guide of claim 1, wherein the main channel has a plurality of third cross-sectional profiles that is different than the first cross-sectional profile and the second cross-sectional profile, wherein the plurality of third cross-sectional profiles is smaller than the second cross-sectional profile and larger than the first cross-sectional profile.

7. The signal guide of claim 1, further comprising:
a second proximal aperture of the base, wherein the second proximal aperture has a third cross-sectional profile, wherein the second proximal aperture is configured to be disposed proximate to a second transceiver element of the sensor device;

a second main channel of the body that adjoins the second proximal aperture; and a second distal aperture of the distal end that adjoins the second main channel, wherein the second distal aperture has a fourth cross-sectional profile, wherein the second distal aperture is configured to be disposed proximate to the ambient environment, wherein the second proximal aperture, the second main channel, and the second distal aperture form a second continuous channel, wherein the third cross-sectional profile is different than the fourth cross-sectional profile, and wherein the second continuous channel is configured to transfer signals between the second transceiver element of the sensor device and the ambient environment.

8. The signal guide of claim 7, wherein the at least one gap physically separates the first main channel and the second main channel.

9. The signal guide of claim 1, wherein the body further comprises at least one positioning element that is configured to position the first proximal aperture in a particular location relative to the first transceiver element of the sensor device.

10. A sensor device subassembly, comprising:
a first sensor device comprising a first transceiver element; and a signal guide disposed adjacent to the first transceiver element, wherein the signal guide comprises:
a base comprising a first proximal aperture, wherein the first proximal aperture has a first cross-sectional profile, wherein the first proximal aperture is disposed proximate to the first transceiver element of the first sensor device;

a body disposed adjacent to the base, wherein the body comprises a first main channel that adjoins the first proximal aperture;

a distal end disposed adjacent to the body opposite the base of the signal guide, wherein the distal end comprises a first distal aperture that adjoins the first main channel, wherein the first distal aperture has a second cross-sectional profile, wherein the first distal aperture is configured to be disposed proximate to an ambient environment; and at least one gap that traverses at least a portion of the body, wherein the at least one gap is used, in part, to form variations in a first main channel cross-sectional profile of the first main channel, wherein the first proximal aperture, the first main channel, and the first distal aperture form a first continuous channel, wherein the first cross-sectional profile is different than the second cross-sectional profile, and wherein the first continuous channel transfers a first plurality of signals between the first transceiver element of the first sensor device and the ambient environment.

11. The sensor device subassembly of claim 10, wherein the first plurality of signals comprises a light wave that is received by the first transceiver element of the first sensor device from the ambient environment through the first continuous channel.

12. The sensor device subassembly of claim 11, wherein the light wave originates from a field of angular distribution in the ambient environment, wherein the field of angular distribution is defined by the second cross-sectional profile of the first distal aperture and the first cross-sectional profile of the proximal aperture of the first continuous channel.

13. The sensor device subassembly of claim 12, wherein the field of angular distribution is further defined by a plurality of third cross-sectional profiles of the main channel of the first continuous channel.

14. The sensor device subassembly of claim 10, further comprising:
a second sensor device comprising a second transceiver element; and a second continuous channel of the signal guide, wherein the second continuous channel is disposed adjacent to the second transceiver element, and wherein the second continuous channel comprises:
a second proximal aperture disposed in the base, wherein the second proximal aperture has a third cross-sectional profile, wherein the second proximal aperture is disposed proximate to the second transceiver element of the second sensor device;

a second main channel of the body that adjoins the second proximal aperture; and a second distal aperture of the distal end adjoins the second main channel opposite the second proximal aperture, wherein the second distal aperture has a fourth cross-sectional profile, wherein the second distal aperture is configured to be disposed proximate to the ambient environment, wherein the third cross-sectional profile is different than the fourth cross-sectional profile, and wherein the second continuous channel transfers a second plurality of signals between the second transceiver element of the second sensor device and the ambient environment.

15. The sensor device subassembly of claim 14, wherein the second plurality of signals comprises a light wave that is sent by the first transceiver element of the sensor device to the ambient environment through the first continuous channel.

16. The sensor device subassembly of claim 15, wherein the light wave is delivered to a field of angular distribution in the ambient environment, wherein the field of angular distribution is defined by the second cross-sectional profile of the first distal aperture and the first cross-sectional profile of the proximal aperture of the first continuous channel.

17. A system comprising:
   a sensor device comprising at least one transceiver element;
   a signal guide disposed adjacent to the at least one transceiver element, wherein the signal guide comprises:
      a base comprising a proximal aperture, wherein the proximal aperture has a first cross-sectional profile, wherein the proximal aperture is disposed proximate to the at least one transceiver element of the sensor device;
      a body disposed adjacent to the base, wherein the body comprises a main channel that adjoins the proximal aperture;
      a distal end disposed adjacent to the body opposite the base of the signal guide, wherein the distal end comprises a distal aperture that adjoins the main channel, wherein the distal aperture has a second cross-sectional profile; and
      at least one gap that traverses at least a portion of the body, wherein the at least one gap is used, in part, to form variations in a first main channel cross-sectional profile of the first main channel; and
   an operational device comprising an aperture, wherein the distal end of the signal guide is disposed adjacent to the aperture and is exposed to an ambient environment,
   wherein the proximal aperture, the main channel, and the distal aperture form a continuous channel between the ambient environment and the at least one transceiver element of the sensor device.

18. The system of claim 17, wherein the operational device is a light fixture, and wherein the aperture traverses a trim of the light fixture.

19. The system of claim 17, wherein the body of the signal guide further comprises at least one positioning element that orients the first proximal aperture in a particular location relative to the first transceiver element of the sensor device, wherein the at least one positioning element abuts against at least one selected from a group consisting of the sensor device and a component on a circuit board on which the sensor device is disposed.

20. The system of claim 17, wherein the operational device is controlled using the sensor device based on at least one signal transmitted through the continuous channel of the signal guide.

* * * * *